US007668379B2

(12) United States Patent
Vienneau

(10) Patent No.: US 7,668,379 B2
(45) Date of Patent: Feb. 23, 2010

(54) IMAGE PROCESSING DEFINED BY A HIERARCHY OF DATA PROCESSING NODES

(75) Inventor: Christopher Vienneau, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 807 days.

(21) Appl. No.: 10/818,530

(22) Filed: Apr. 5, 2004

(65) Prior Publication Data

US 2004/0252902 A1  Dec. 16, 2004

(30) Foreign Application Priority Data

Apr. 5, 2003  (GB) ................................. 0307911.8

(51) Int. Cl.
  *G06K 9/62* (2006.01)
  *G06K 9/68* (2006.01)
  *G06K 9/70* (2006.01)
  *G06F 7/00* (2006.01)
  *G06F 17/30* (2006.01)
  *G09G 5/00* (2006.01)
(52) U.S. Cl. ........................... 382/226; 382/224; 707/1; 345/619
(58) Field of Classification Search ......... 382/224–229, 382/145, 240; 707/1, 100, 101; 345/619, 345/863; 718/1, 100; 341/79, 14
See application file for complete search history.

(56) References Cited

U.S. PATENT DOCUMENTS 4,944,023 A * 7/1990 Imao et al. .................. 382/240
4,994,023 A * 2/1991 Wellinghoff et al. .......... 604/20
5,109,433 A * 4/1992 Notenboom ................. 382/240

(Continued)

FOREIGN PATENT DOCUMENTS

EP    0 528 631 A2    8/1992

(Continued)

OTHER PUBLICATIONS

Cava et al. "Node Edge Diagram Layout for Displaying Hierarchies" 2001 IEEE Computer Graphics and Image Processing XIV Brazilian Symposium; pp. 373-.*

(Continued)

*Primary Examiner*—Andrew W Johns
*Assistant Examiner*—Mia M Thomas
(74) *Attorney, Agent, or Firm*—Gates & Cooper LLP

(57) ABSTRACT

Apparatus for processing image data is provided, comprising first storage means, processing means and manual input means, wherein said first storage means is configured to store said image data and said image data includes a plurality of components defined by a hierarchy of data processing nodes, and said processing means is configured to process each of said nodes in turn. The nodes include standard nodes and switch nodes, each switch node having at least two child nodes one of which is the designated child node of said switch node. The processing means is configured to process a standard node only when each of its child nodes has been processed, and process a switch node when only its designated child node has been processed. Additionally, said processing means may include second storage means and stores, in either said first or said second storage means, information recording the states of said switch nodes that defines a version of said image data.

29 Claims, 30 Drawing Sheets

U.S. PATENT DOCUMENTS

| | | | | |
|---|---|---|---|---|
| 5,185,813 | A * | 2/1993 | Tsujimoto | 382/180 |
| 5,522,022 | A * | 5/1996 | Rao et al. | 345/440 |
| 5,528,701 | A * | 6/1996 | Aref | 382/178 |
| 5,586,239 | A * | 12/1996 | Ueda | 715/207 |
| 5,649,030 | A * | 7/1997 | Normile et al. | 382/253 |
| 5,768,423 | A * | 6/1998 | Aref et al. | 382/228 |
| 5,861,827 | A * | 1/1999 | Welch et al. | 341/51 |
| 5,907,637 | A * | 5/1999 | Murashita et al. | 382/239 |
| 5,946,418 | A * | 8/1999 | Yoneda | 382/240 |
| 5,973,694 | A * | 10/1999 | Steele et al. | 715/835 |
| 5,982,938 | A * | 11/1999 | Dube | 382/240 |
| 5,987,171 | A * | 11/1999 | Wang | 382/173 |
| 6,122,645 | A * | 9/2000 | Bohannon et al. | 707/203 |
| 6,195,463 | B1 * | 2/2001 | Kondo et al. | 382/240 |
| 6,295,380 | B1 * | 9/2001 | Takahashi | 382/240 |
| 6,351,753 | B1 * | 2/2002 | Jagadish et al. | 707/203 |
| 6,385,768 | B1 * | 5/2002 | Ziebell | 717/121 |
| 6,414,700 | B1 * | 7/2002 | Kurtenbach et al. | 715/810 |
| 6,496,198 | B1 * | 12/2002 | Wang | 345/629 |
| 6,580,756 | B1 * | 6/2003 | Matsui et al. | 375/240.08 |
| 6,618,063 | B1 * | 9/2003 | Kurtenbach | 715/834 |
| 6,792,163 | B2 * | 9/2004 | Seol et al. | 382/305 |
| 6,826,576 | B2 * | 11/2004 | Lulich et al. | 707/102 |
| 6,968,077 | B1 * | 11/2005 | Yamanaka | 382/128 |
| 6,999,958 | B2 * | 2/2006 | Carlson et al. | 707/3 |
| 7,028,057 | B1 * | 4/2006 | Vasudevan et al. | 707/203 |
| 7,149,370 | B2 * | 12/2006 | Willner et al. | 382/305 |
| 7,257,258 | B2 * | 8/2007 | Ruff, Jr. et al. | 382/224 |
| 7,292,255 | B2 * | 11/2007 | Doan et al. | 345/629 |
| 7,305,419 | B1 * | 12/2007 | Cosby et al. | 707/200 |
| 7,362,909 | B2 * | 4/2008 | Watanabe et al. | 382/240 |
| 7,383,274 | B2 * | 6/2008 | Pearce et al. | 707/101 |
| 7,530,026 | B2 * | 5/2009 | Chaudhri et al. | 715/764 |
| 2002/0126097 | A1 * | 9/2002 | Savolainen | 345/168 |
| 2003/0101169 | A1 * | 5/2003 | Bhatt et al. | 707/3 |
| 2003/0193526 | A1 * | 10/2003 | Stegbauer et al. | 345/848 |
| 2004/0051728 | A1 * | 3/2004 | Vienneau et al. | 345/723 |
| 2005/0017975 | A1 * | 1/2005 | Russo | 345/427 |
| 2005/0028101 | A1 * | 2/2005 | Vienneau et al. | 715/716 |
| 2006/0262137 | A1 * | 11/2006 | Lempp et al. | 345/619 |

FOREIGN PATENT DOCUMENTS

GB    2 363 017  A    3/2000

OTHER PUBLICATIONS

Strens et al. A Class Hierarchy Approach for the Segmentation of Natural Scenes (1997), Proceedings of the Sixth International Conference on Image Processing and its Applications; pp. 146-150.*

Vailaya et al. "Image Classification for Content Based Indexing" IEEE Transactions on Image Processing, vol. 10, No. 1, Jan. 2001, pp. 117-130.*

Gibson et al. "Rapid Shadow Generation in Real World Lighting Environments" Eurographics Symposium on Rendering 2003 pp. 1-12.*

* cited by examiner

| NODE ID | CHILD | PARENT | NODE TYPE | NODE NAME |
|---|---|---|---|---|
| 0001 | 0002:0015 | — | SCENE OUTPUT | SCENE |
| 0002 | 0003:0008:0010:0013 | 0001 | KEYING | KEYING |
| 0003 | 0004 | 0002 | LIGHTING | LIGHTING |
| 0004 | 0005 | 0003 | TRACKING | TRACKING |
| 0005 | 0006 | 0004 | TEXTURE | TEXTURE |
| 0006 | — | 0005 | MODELLER | BOTTLE |
| 0007 | 0008 | | | |
| 0008 | — | 0002 | TRACKING | TRACKING |
| 0009 | 0010 | | | |
| 0010 | 0011 | 0002 | TEXT | TEXT |
| 0011 | 0012 | 0009 | TRACKING | TRACKING |
| 0012 | — | 0010 | SCALING | SCALING |
| 0013 | 0014 | 0011 | MATTE | MATTE |
| 0014 | — | 0002 | FRAME SUPPRESS | FOREGROUND CORRECTION |
| 0015 | — | 0013 | FRAME | BACKGROUND |
| | | 0001 | MIXER | AUDIO |

*Figure 9*

| NODE ID | CHILD | PARENT | NODE TYPE | NODE NAME |
|---|---|---|---|---|
| ... | ... | ... | ... | ... |
| 0012 | — | 0028 | FRAME | FOREGROUND TV |
| 0013 | 0014 | 0030 | SUPPRESS | CORRECTION 1 |
| 0014 | — | 0013:0031:0032 | FRAME | BACKGROUND |
| 0015 | — | 0021 | MIXER | AUDIO US |
| 0016 | 0005:0017:0019 | 0004 | SWITCH | LABEL SWITCH |
| 0017 | — | 0016 | TEXT | LABEL ES |
| 0018 | — | 0017 | MODELLER | BOTTLE |
| 0019 | — | 0016 | TEXT | LABEL FR |
| 0020 | — | 0019 | MODELLER | BOTTLE |
| 0021 | 0015:0022:0023:0024 | 0001 | SWITCH | AUDIO SWITCH |
| 0022 | — | 0021 | MIXER | AUDIO UK |
| 0023 | — | 0021 | MIXER | AUDIO ES |
| 0024 | — | 0021 | MIXER | AUDIO FR |
| 0025 | 0008:0026:0027 | 0007 | SWITCH | TEXT SWITCH |
| 0026 | — | 0005 | TEXT | TEXT ES |
| 0027 | — | 0005 | TEXT | TEXT FR |
| 0028 | — | 0011 | SWITCH | FOREGROUND SWITCH |
| 0029 | 0012:0029 | 0027 | FRAME | FOREGROUND CINEMA |
| 0030 | 0013:0031:0032 | 0002 | SWITCH | CORRECTION SWITCH |
| 0031 | 0014 | 0030 | SUPPRESS | CORRECTION 2 |
| 0032 | 0014 | 0030 | SUPPRESS | CORRECTION 3 |

*Figure 13*

| | 1401 | 1402 | 1403 | 1404 | 1405 | 1406 | 1407 |
|---|---|---|---|---|---|---|---|
| | VERSION | CURRENT | 0016 | 0021 | 0025 | 0028 | 0030 |
| 1011 | FRANCE CINEMA | | 0019 | 0024 | 0027 | 0029 | 0031 |
| 1012 | SPAIN CINEMA | | 0017 | 0023 | 0026 | 0029 | 0031 |
| 1013 | UK CINEMA | | 0005 | 0022 | 0008 | 0029 | 0031 |
| 1014 | UK TV | | 0005 | 0022 | 0008 | 0012 | 0031 |
| 1015 | US CINEMA | | 0005 | 0015 | 0008 | 0029 | 0031 |
| 1016 | US TV | X | 0005 | 0015 | 0008 | 0012 | 0031 |

| NODE ID | CHILD | PARENT | NODE TYPE | NODE NAME |
|---|---|---|---|---|
| 0001 | 0002 | 0005 | SCENE OUTPUT | SCENE |
| 0002 | 0003:0004 | 0001 | KEYING | KEYING |
| 0003 | — | 0002 | FRAME | FOREGROUND |
| 0004 | — | 0002 | FRAME | BACKGROUND |
| 0005 | 0001:0006 | — | SWITCH | SWITCH 1 |
| 0006 | 0007:0014 | 0005 | SCENE OUTPUT | SCENE |
| 0007 | 0009:0010:0013 | 0006 | KEYING | KEYING |
| 0008 | — | 0010 | FRAME | FOREGROUND |
| 0009 | — | 0007 | FRAME | BACKGROUND |
| 0010 | 0008 | 0007 | SUPPRESS | CORRECTION |
| 0011 | — | 0012 | MODELLER | BOTTLE |
| 0012 | 0011 | 0013 | TRACKING | TRACKING |
| 0013 | 0012 | 0007 | LIGHTING | LIGHTING |
| 0014 | — | 0006 | MIXER | AUDIO |

| VERSION | CURRENT | 0005 |
|---|---|---|
| 12 FEB 03 | | 0001 |
| 13 FEB 03 | X | 0006 |

| NODE ID | CHILD | PARENT | NODE TYPE | NODE NAME |
|---|---|---|---|---|
| 0001 | 0002 | — | SCENE OUTPUT | SCENE |
| 0002 | 0003:0005 | 0001 | KEYING | KEYING |
| 0003 | — | 0002 | FRAME | FOREGROUND |
| 0004 | — | 0005 | FRAME | BACKGROUND 1 |
| 0005 | 0004:0006 | 0002 | SWITCH | SWITCH 1 |
| 0006 | 0007 | 0005 | SUPPRESS | CORRECTION |
| 0007 | — | 0006 | FRAME | BACKGROUND 2 |

| VERSION | CURRENT | |
|---|---|---|
| | | 0005 |
| BACKGROUND 1 | X | 0004 |
| BACKGROUND 2 | | 0006 |

IMAGE PROCESSING DEFINED BY A HIERARCHY OF DATA PROCESSING NODES

CROSS-REFERENCE TO RELATED APPLICATIONS

This application claims the benefit under 35 U.S.C. §119 of the following co-pending and commonly assigned foreign patent application, which application is incorporated by reference herein:

United Kingdom Application No. 03 07 911.8, entitled "IMAGE PROCESSING", by Christopher Vienneau, filed on Apr. 5, 2003.

FIELD OF THE INVENTION

The invention relates to processing image data that is defined by a hierarchy of data processing nodes.

DESCRIPTION OF THE RELATED ART

It is known to use a hierarchical structure known as a process tree to store editing decisions made on frames of image data or models created in three or two dimensions. Often a user will wish to have more than one version of this image data, for one of various reasons. For example, it may be that more than one version of a product is required, such as a commercial produced in more than one language. It may be because he wants to save his earlier work, more than one person is working on the image data, he wishes to quickly see the difference between applying one effect or another. Alternatively, he may be required to make more than one version of a scene for director approval.

In prior art systems each of these versions of a scene must be created separately. There is no way of automatically updating one version of a scene based on changes made in another. In a process tree typically comprising thousands of nodes it is easy for versions of a scene to become more and more different from each other as mistakes are made.

There is therefore a need for an image processing environment that allows versions of a scene to be created whereby when the user makes changes he can apply them either to a single version, to multiple versions or to every version.

BRIEF SUMMARY OF THE INVENTION

According to a first aspect of the invention, there is provided apparatus for processing image data, comprising storage means, processing means and manual input means, wherein said storage means is configured to store said image data and said image data includes a plurality of components defined by a hierarchy of data processing nodes, and said processing means is configured to process each of said nodes in turn, wherein said nodes include standard nodes and switch nodes, each switch node having at least two child nodes one of which is the designated child node of said switch node; and said processing means is configured to process a standard node only when each of its child nodes has been processed, and process a switch node when only its designated child node has been processed.

According to a second aspect of the invention, there is provided apparatus for processing image data comprising first storage means, processing means and manual input means, wherein said first storage means is configured to store said image data and said image data includes a plurality of components defined by a hierarchy of data processing nodes, said nodes including switch nodes; and said processing means includes second storage means and is configured to store, in either said first or said second storage means, information recording the states of said switch nodes that defines a version of said image data.

BRIEF DESCRIPTION OF THE SEVERAL VIEWS OF THE DRAWINGS

FIG. 9 shows a nodes table used to produce the process tree shown in FIG. 7;

FIG. 13 shows a nodes table used to produce the process tree shown in FIGS. 12A and 12B;

FIG. 14 shows a versions table used to produce the process tree shown in FIGS. 12A and 12B;

FIG. 25 shows a nodes table used to produce the process tree shown in FIG. 24;

FIG. 26 shows a versions table used to produce the process tree shown in FIG. 24;

FIG. 28 shows a nodes table used to produce the process tree shown in FIG. 27; and FIG. 29 shows a versions table used to produce the process tree shown in FIG. 27.

WRITTEN DESCRIPTION OF THE BEST MODE FOR CARRYING OUT THE INVENTION

FIG. 1

Figure 1:
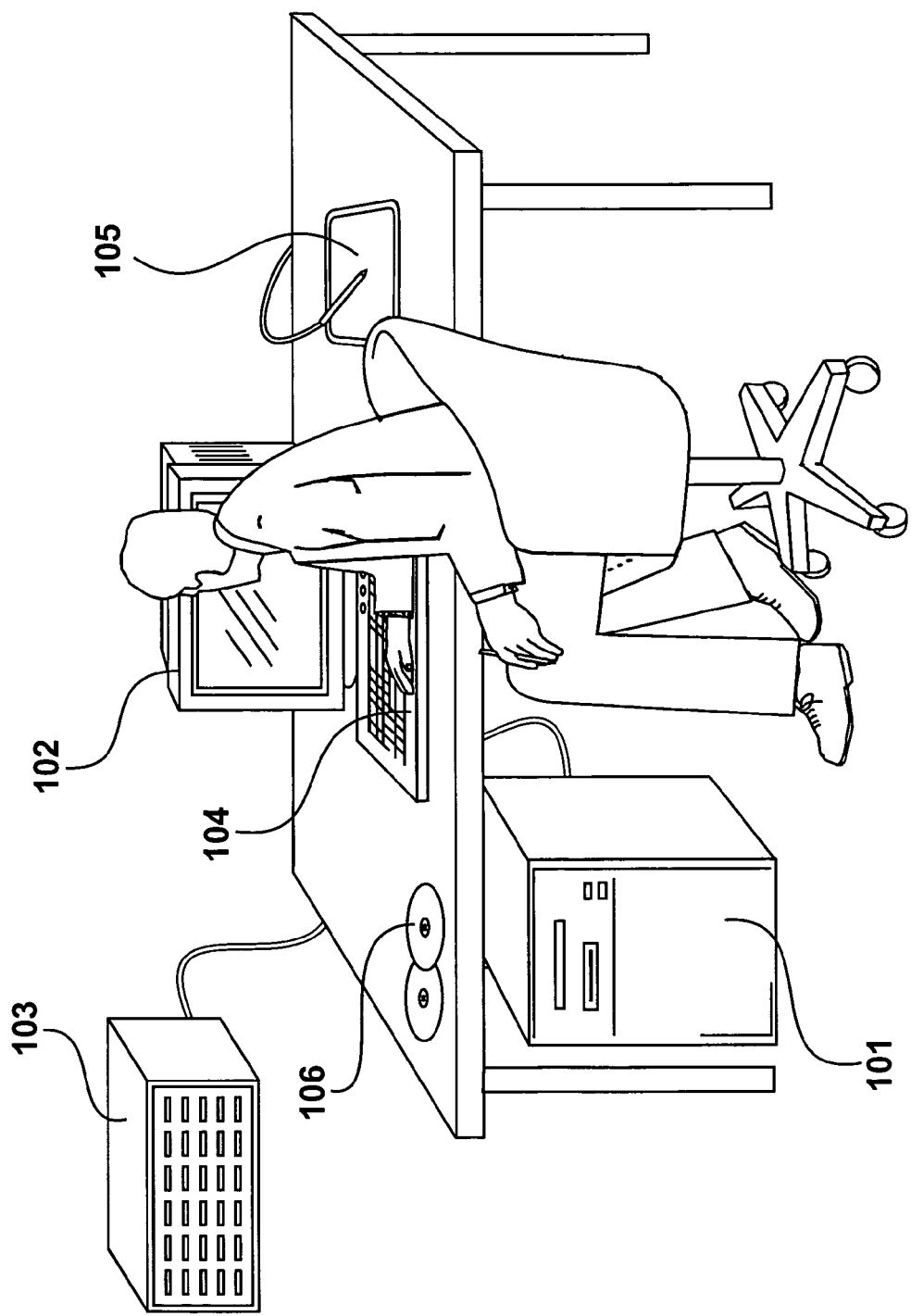
FIG. 1 shows an image processing environment.

An example of apparatus that can be used to carry out the present invention is shown in FIG. 1 which illustrates an image processing environment, such as an online editing station. A processing system 101, in this example an Octane™ produced by Silicon Graphics Inc., supplies image signals to a video display unit (VDU) 102. Image data is stored on a redundant array of inexpensive disks (RAID) 103. The RAID is configured in such a way as to store a large volume of data, and to supply this data to processing system 101, when required, at a high bandwidth. The operator controls the image processing environment formed by the processing system 101, the VDU 102 and the RAID 103 by means of a keyboard 104 and a stylus-operated graphics tablet 105. The environment shown in FIG. 1 is optimal for the purpose of processing image and other high-bandwidth data. In such a system, the instructions for controlling the processing system are complex, and the invention relates to any computer system where processing instructions are of significant complexity.

Instructions controlling the processing system 101 may be installed from a physical medium such as a CD-ROM disk 106, or over a network, including the Internet. These instructions enable the processing system 101 to interpret user commands from the keyboard 104 and the graphics tablet 105 such that data may be viewed, edited and processed.

FIG. 2

Figure 2:
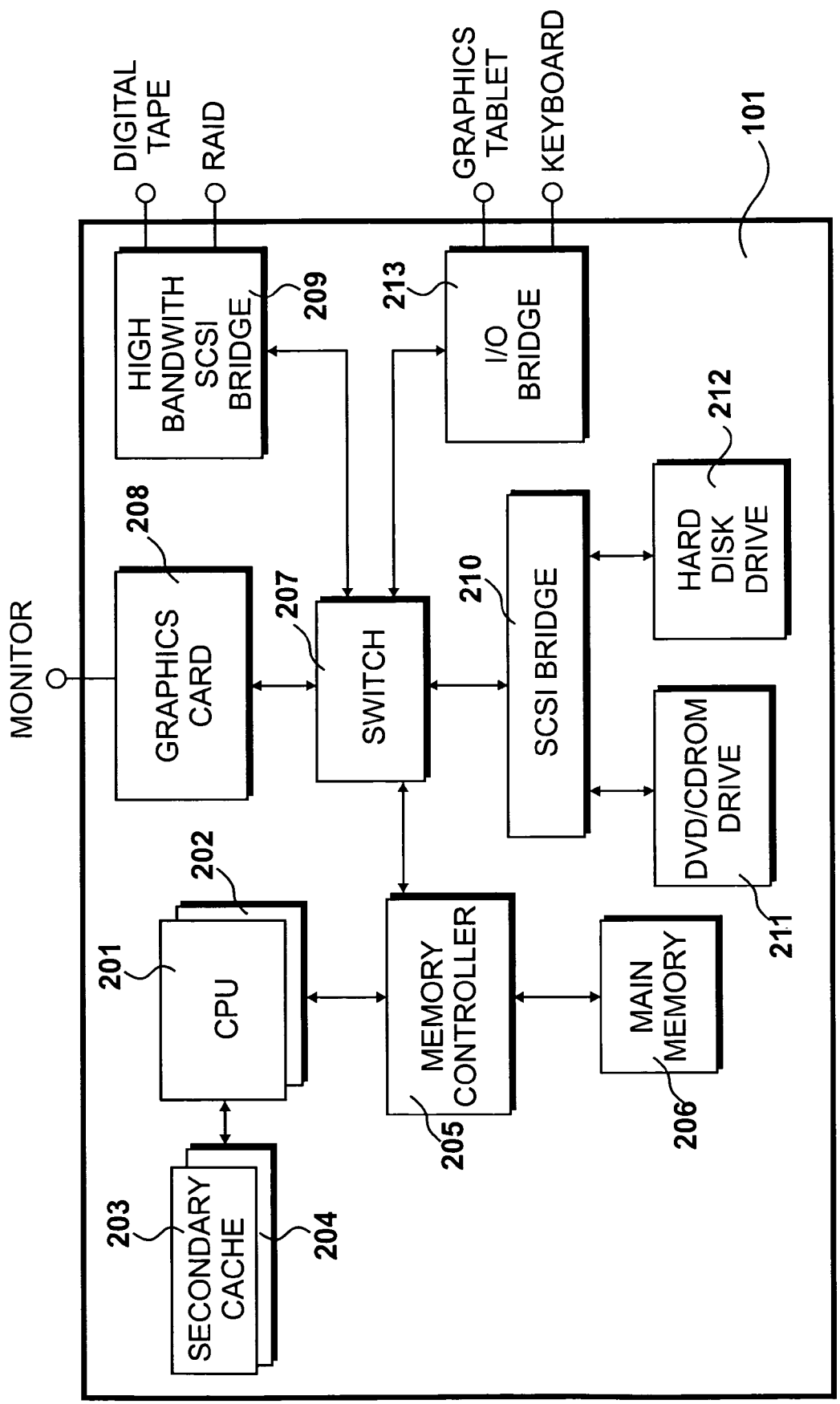
FIG. 2 shows a processing system shown in FIG. 1.

The processing system 101 shown in FIG. 1 is detailed in FIG. 2. The processing system comprises two central processing units (CPUs) 201 and 202 operating in parallel. Each of these processors is a MIPS R11000 manufactured by MIPS Technologies Incorporated, of Mountain View, Calif. Each of these CPUs 201 and 202 has a dedicated secondary cache memory 203 and 204 that facilitates per-CPU storage of frequently used instructions and data. Each CPU 201 and 202 further includes separate primary instruction and data cache memory circuits on the same chip, thereby facilitating a further level of processing improvement. A memory controller 205 provides a common connection between the CPUs 201 and 202 and a main memory 206. The main memory 206 comprises two gigabytes of dynamic RAM.

The memory controller 205 further facilitates connectivity between the aforementioned components of the processing system 101 and a high bandwidth non-blocking crossbar switch 207. The switch makes it possible to provide a direct high capacity connection between any of several attached circuits. These include a graphics card 208. The graphics card 208 generally receives instructions from the CPUs 201 and 202 to perform various types of graphical image rendering processes, resulting in images, clips and scenes being rendered in real time on the monitor 102. A high bandwidth SCSI bridge 209 provides an interface to the RAID 103, and also, optionally, to a digital tape device, for use as backup.

A second SCSI bridge 210 facilitates connection between the crossbar switch 207 and a DVD/CD-ROM drive 211. The CD-ROM drive provides a convenient way of receiving large quantities of instructions and data, and is typically used to install instructions for the processing system 101 onto a hard disk drive 212. Once installed, instructions located on the hard disk drive 212 may be fetched into main memory 206 and then executed by the CPUs 201 and 202. An input/output bridge 213 provides an interface for the graphics tablet 105 and the keyboard 104, through which the user is able to provide instructions to the processing system 101.

FIG. 3

Figure 3:
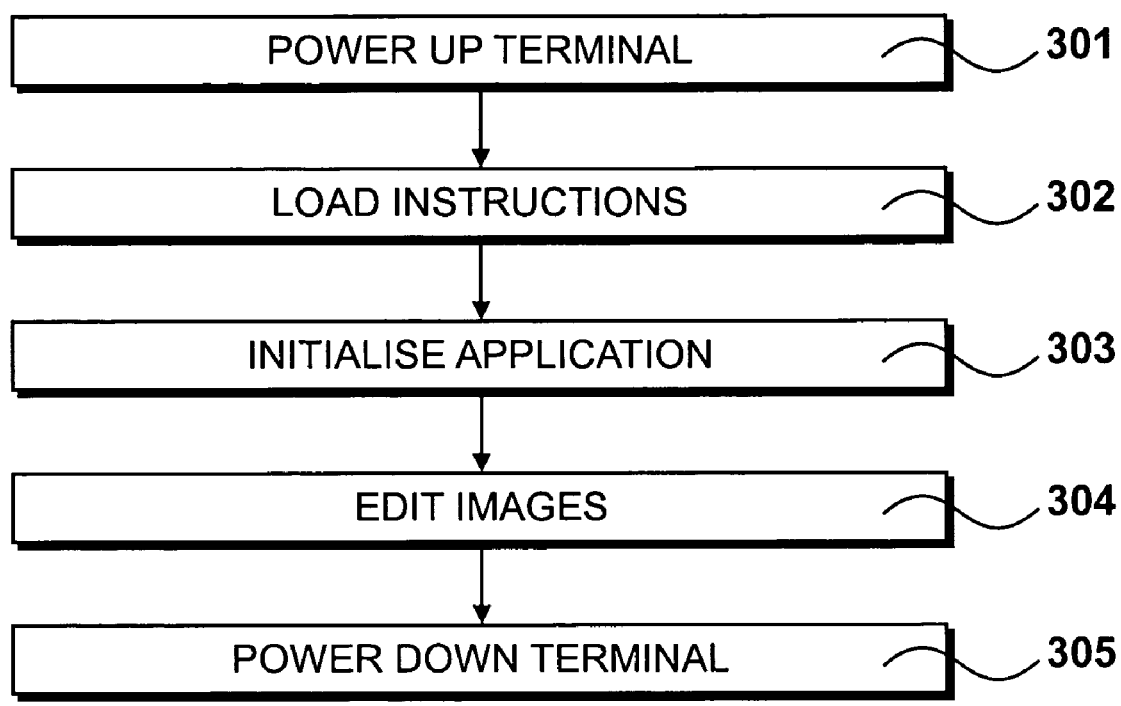
FIG. 3 shows steps carried out by the user of the processing system shown in FIG. 2 to edit image data.

FIG. 3 details steps carried out by processing system 101. Processing system 101 is switched on by the user at step 301, such that at step 302 CPU instructions may be permanently loaded onto hard disk drive 212 or temporarily loaded within main memory 206 from CD ROM or CD-ROM 106 or a network.

Upon completing the loading operation of step 302, the application is initialised at step 303, whereby the instructions thereof are processed by CPUs 201 and 202. At step 304, image data is selected and edited by the user and at step 305 the system is switched off.

Figure 4:
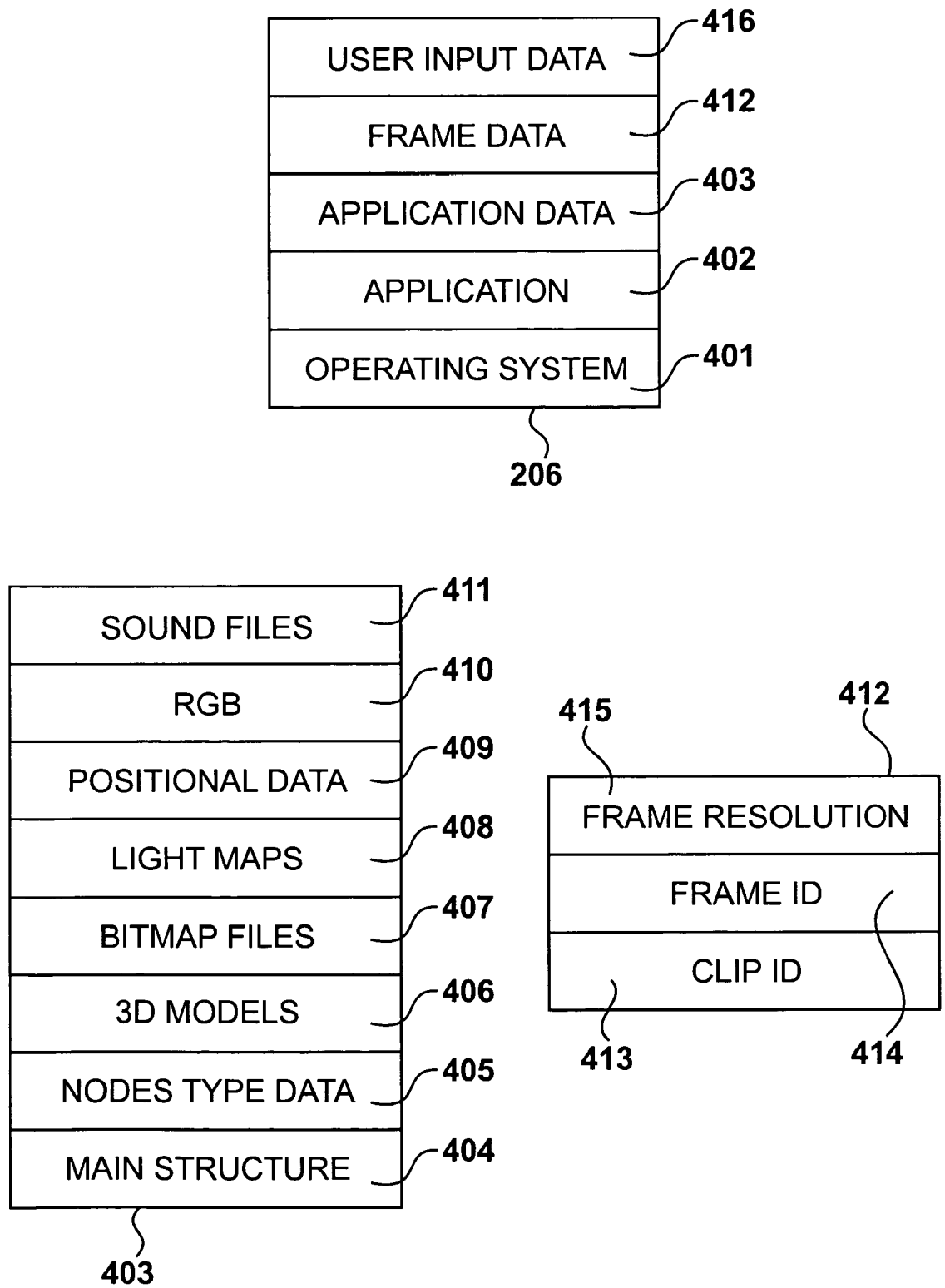
FIG. 4 illustrates the contents of the memory of the processing system shown in FIG. 2 during steps carried out in FIG. 3.

The contents of main memory 206 subsequent to the initialisation step 303 are further detailed in FIG. 4.

FIG. 4

An operating system is shown at 401 which comprises a reduced set of instructions for CPUs 201 and 202, the purpose of which is to provide image processing system 101 with basic functionality. Examples of basic functions include access to files stored on hard disk drive 212 or DVD/CD ROM drive 211 and management thereof, network connectivity with RAID 103 and possibly with a network, interpretation and processing of the input from keyboard 104 and graphic tablet 105 and graphical data or binary data output. In the example, the operating system is IRIX™ provided by Silicon Graphics Inc, but it will be apparent to those skilled in the art that the instructions described herein may be easily adapted to function under different other known operating systems, such as Windows™ provided by the Microsoft Corporation of Redmond, Wash. or LINUX which is freely distributed.

An application is shown at 402 which comprises the instructions loaded at step 302 that enable the image processing system 102 to perform editing at step 304.

Application data is shown at 403 and comprises various sets of user input-dependent data and user input-independent data, according to which the application shown at 402 processes image data. Said application data primarily includes main structure data 404 which, using hierarchically structured data processing nodes, comprehensively defines each component within an image frame. Accordingly, application data 403 also includes data 405 defining the various types of data processing nodes present within the structure or which may be inserted therein as a consequence of image data editing.

Further to the main structure data 404 and nodes definition data 405, application data 403 includes node data 406 to 411 to be processed in order to generate the current image frame; that is, the parameters and data which, when processed by their respective data processing nodes, generate the various components of said image frame.

In the example herein described, node data comprises three-dimensional models 406 defined as a plurality of polygons or possibly non-uniform rational B-splines (NURBS). Node data also comprises bitmap files 407 to be applied as textures to said three-dimensional models 406, and lightmaps 408.

Node data also comprises three-dimensional positional data 409, possibly in the form of vectors, to define scaling and tracking of said three-dimensional models 406 within a three-dimensional space. Node data also comprises RGB data 410 defining an image frame derived from film and digitally stored in RAID 103. Node data finally comprises sound files 411, for instance the portion of clip soundtrack corresponding to the image frame being edited. It will be easily understood by those skilled in the art that the above data types are for illustrative purposes only and the list described is non-exhaustive. Said data types relate to the type of data processing nodes required to define and generate the image frame components, and it will be understood that a very large number of data types are currently used and possible in the future.

Frame data is shown at 412, which comprises user input-independent data defining image frames stored on RAID 103. Said definition includes, for each frame on the RAID, a Clip ID 413 which references the clip that the frame is part of and a Frame ID 414 which references the frame. Frame data 412 also includes frame resolution 415 indicating the frame size in terms of picture screen elements, known to those skilled in the art as pixels, such that application 402 may appropriately configure output data for display at full resolution.

Finally, user input data is shown at 416, which comprises user input-dependent data identifying parameters or data that is input by the user by means of keyboard 105 and graphic tablet 106 for the purpose of editing the above image data.

FIG. 5

Figure 5:
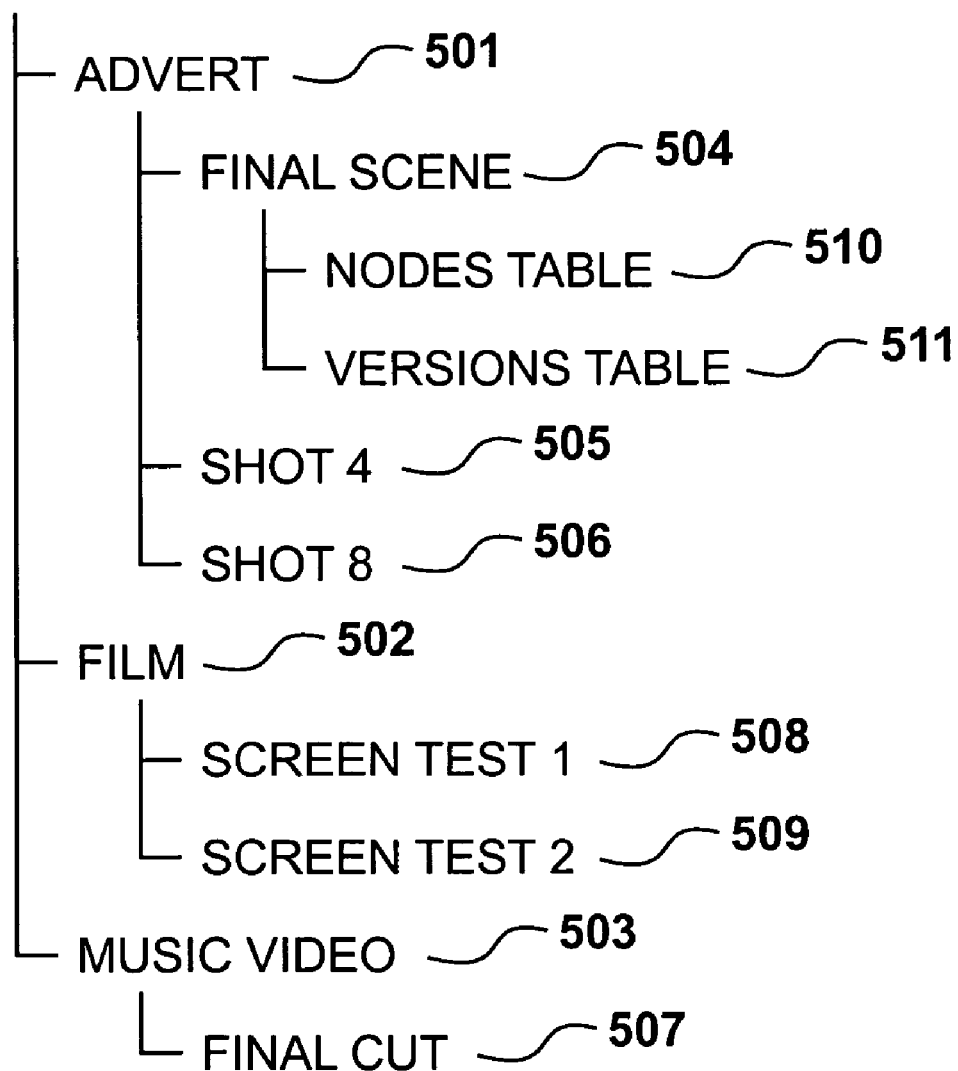
FIG. 5 details a main structure contained in the memory shown in FIG. 4.

FIG. 5 shows the contents of main structure 404. The top of the structure lists the projects available to the user of processing system 101. This information may be stored on processing system 101 or on RAID 103 before it is loaded into memory 206. In this example there are three projects. Project 501 is labelled "ADVERT", project 502 is labelled "FILM" and project 503 is labelled "MUSIC VIDEO". Usage of projects in this way enables a user to organise his work. Within each project is a number of scenes, for example scenes 504, 505 and 506, labelled "FINAL SCENE", "SHOT 4" and "SHOT 8" respectively, within project 501. These scenes may later be edited together, as is shown by the single scene 507 within project 503, labelled "FINAL CUT", or may be completely separate, for example the two scenes 508 and 509 within project 502 which contain screen tests for different actors.

Within each scene are two tables, one defining the hierarchical node structure and one defining the versions of the scene. For example, scene 504 contains nodes table 510 and versions table 511. The tables are not shown for scenes 505 to 509.

This structure is arranged in a hierarchy for ease of reference but the skilled user will understand that there are many ways of storing data that would be equally suitable.

FIG. 6

Figure 6:
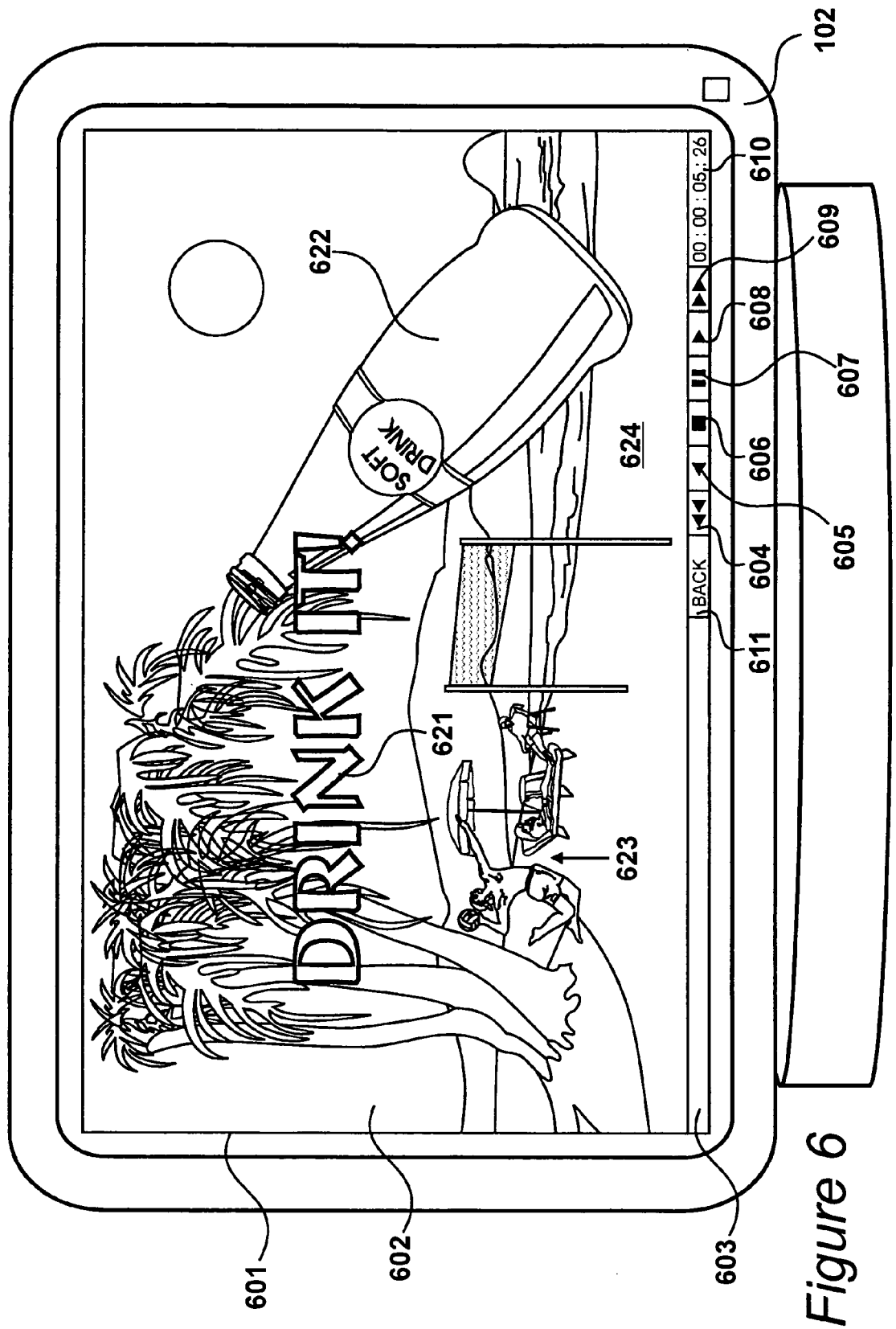
FIG. 6 illustrates a graphical user interface (GUI) displayed on the VDU shown in FIG. 1 including image data.

An example of a scene that can be created by the user of the processing environment in FIG. 1 during step 304 is illustrated in FIG. 6. Displayed on VDU 102 is a graphical user interface (GUI) 601. It is divided into two areas. The first area contains image data 602 according to the scene created by the user. In this example the scene is the last scene of a soft drink commercial and comprises text 621, bottle 622, a foreground 623 of three people relaxing and a background 624 of a tropical beach. A voiceover is also provided.

A second area 603 contains user-operable conventional clip navigation controls allowing the user to rewind 604, backward play 605, stop 606, pause 607, forward play 608 or fast-forward 609 the sequential order of image frames.

A counter area 610 is also provided and displays hours, minutes, seconds and frames, whereby said frame counter may operate in base twenty-four, base thirty or base sixty. Counter area 610 enables the user to accurately determine where the currently displayed image frame is located within the complete sequence of the scene.

GUI 601 displays a full screen. It only allows playback of the scene and another GUI that includes editing controls will be described with reference to FIG. 15. Thus area 603 includes a button 611 which enables the user to return to the editing GUI.

In an alternative embodiment (not shown) it is envisaged that different versions of application 402 would be available, with some offering full or restricted editing functionality and one version only offering playback. In the latter case button 611 would exit playback of the scene rather than return to editing mode.

FIG. 7

Figure 7:
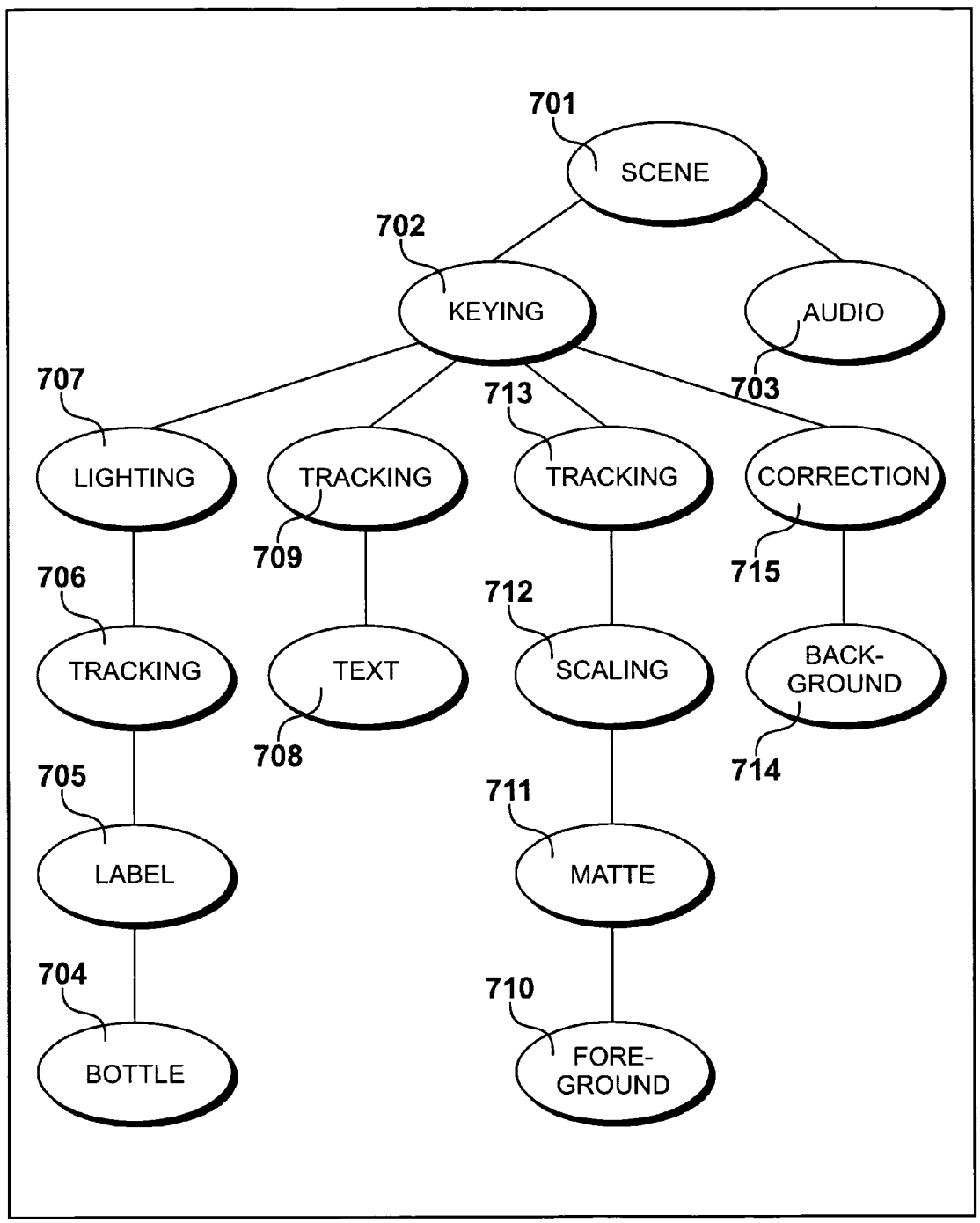
FIG. 7 illustrates a prior art process tree.

A simplified example of a prior art hierarchical node structure, also known to those skilled in the art as an edit decision list or process tree, is shown in FIG. 7.

A process tree consists of hierarchical, sequentially linked data processing nodes, each of which specifies a particular processing task required in order to eventually achieve scene output data. In FIG. 7 all the nodes shown are standard nodes, as opposed to switch nodes which will be described later with reference to FIG. 12. In this example scene output data 701 is in the form of scene 602. Traditionally, an output sequence 701 will comprise both image data and audio data. Accordingly, the scene will thus require the output from an image-keying node 702 and the output of a sound mixing node 703. The image-keying node 702 calls on a plurality of further graphic data processing nodes to obtain all of the input data it requires to generate the desired image components. In effect, all the nodes in the process tree define 'branches' of parent and children nodes. A child of a node is one which is directly below and linked to that node, which is the child's parent. For example, node 701 has children 702 and 703, and node 702 has parent 701. Each node is both a child and a parent unless it occurs at the top of the tree or at the end of a branch. A node's branch is defined as all the children of that node, plus their children, plus their children and so on. For example, the branch of node 702 consists of all nodes in the tree except 701 and 703, the branch of node 707 consists of nodes 704 to 706 and node 704 does not have a branch because it has no children. Thus every branch is made up of smaller branches.

In effect, and, insofar as the graphical nodes of the tree shown in FIG. 7 are concerned, each branch of nodes born from the ultimate graphical parent node 702, that is the branches of nodes 707, 709, 713 and 715, defines a layer. The purpose of image-keying node 702 is thus to composite the layers; that is superimpose the four layers shown in the example, which are further detailed below.

In the example shown in FIG. 6, the desired output image frame includes a three-dimensional computer generated object (bottle 622) composited with a foreground frame 623 and a background 624, all superimposed by text 621, as shown in FIG. 6.

The image-keying node 702 thus requires input from all four of its child nodes. The composited three-dimensional model 406 of a bottle is generated by three-dimensional modelling node 704, to which is applied a bitmap file 407 of a label as a texture by the texturing node 705. It is subjected to positional data 409 of a motion tracking processing node 706 and an appropriate lightmap 408 is applied by artificial light processing node 707.

Node 708 pulls text stored as a bitmap 407 which is positioned by tracking node 709.

The next branch initially requires a frame as RGB data 410 from frame node 710. A matte is pulled from this by node 711, the picture is scaled by node 712 and subjected to positional data 409 of tracking node 713.

Finally a background is needed. The RGB data 410 provided by the frame from node 714 is subjected to colour correction by node 715.

The image-keying processing node 702 finally overlays the results of the four branches together to create the picture shown in FIG. 6. The scene 701 is completed by associating the output of sound mixing node 703 with the output of image keying node 702.

Thus a standard node is not processed until all of its child nodes have been processed. This ensures that all the information needed to process a node can be pulled by that node. A traversal of a hierarchical processing tree always starts with a node having no children and always ends with the node that has no parents.

FIG. 8

Figure 8:
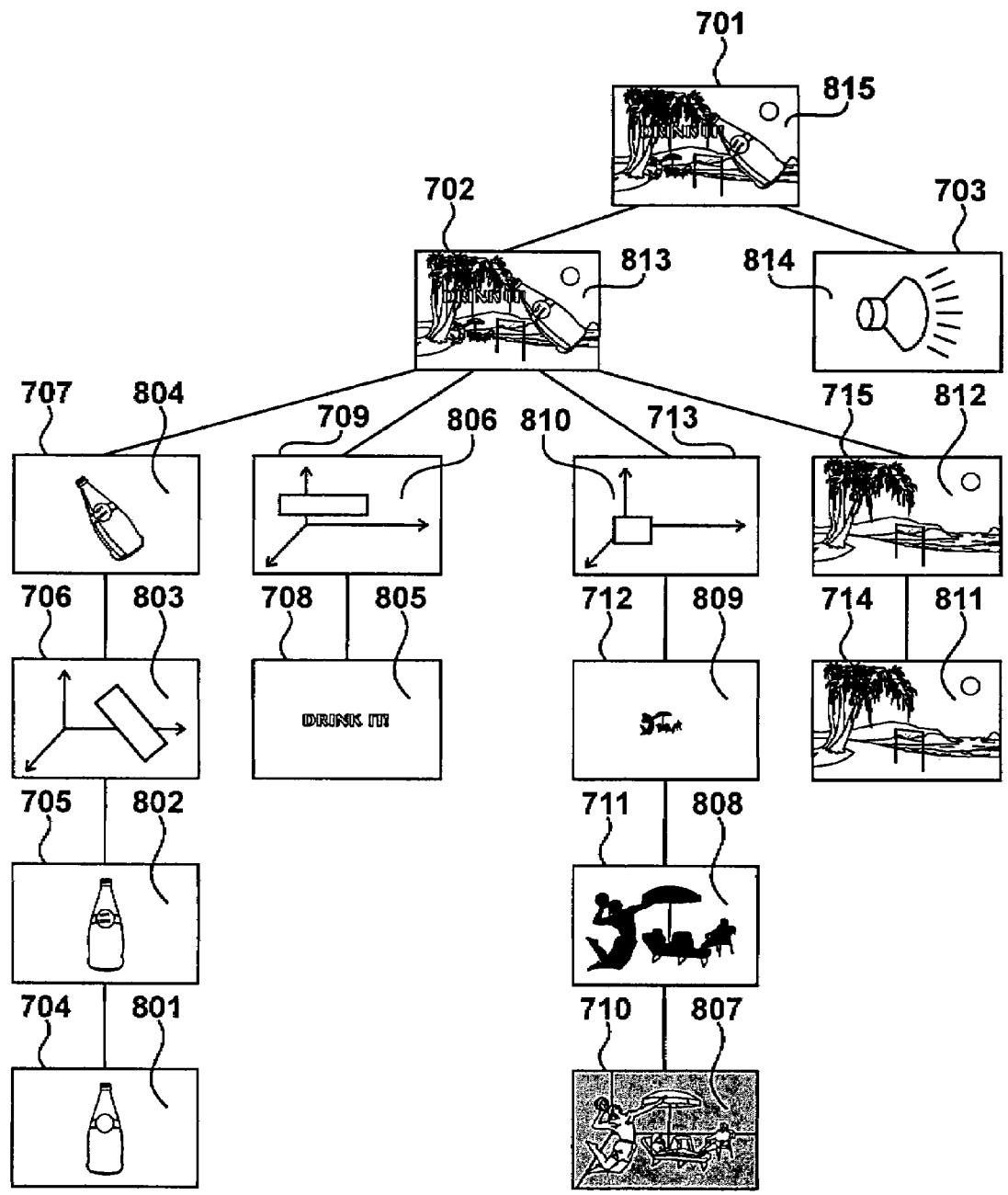
FIG. 8 shows the effect of the process tree shown in FIG. 7 on image data.

The respective output data of each parent and children nodes 701 to 715 of the process tree detailed in FIG. 7 are graphically shown in FIG. 8 in order to illustrate the application data 403 processed during step 304.

The generation of all of the image components requires processing of all of the data processing nodes within the process tree. A simple rule is followed, to the effect that a node is not processed until all the nodes in its branch have been processed, to which end the processing begins at the leftmost last child node 704, whereby an operational function of said child node 704 is invoked in order to fetch a 3D model 801 of a bottle. Node 705 is a parent node of node 704 and subsequently pulls the frame 801 from node 704, and applies the texture of the label to the bottle to create bottle 802. The parent node 706 of node 705 subsequently pulls the data of node 705 and calls an operational function designed to orientate the bottle within a three dimensional volume 803. Processing node 707 subsequently applies an artificial lighting algorithm 408 at 804.

Since node 702 has more children it is not processed yet. The end of the next branch is node 708, which pulls a bitmap of text 805. Node 709 then positions the text at 806. This branch is now complete. Node 710 pulls foreground frame 807 which depicts actors photographed in front of a blue or green background in order to facilitate subsequent keying processes, depending upon whether the image was respectively shot for video or cinematography. Parent node 711 creates a matte 808 which is subsequently scaled 809 by node 712 and positioned 810 by node 713.

The final branch ends with node 714, which pulls a background frame 811. Node 715 then modifies the colour 812 of said frame by applying a processing rule to the RGB values of every pixel in said frame.

At this point every node in node 702's branch has been processed and it is thus able to pull all of the input data 801 to 812 and process it in order to generate a composite frame 813 comprising all four elements. Sound data 814 will then be processed by node 703, whereby output node 701 outputs final graphic data 813 and sound data 814 as an image frame 815.

FIG. 9

Although nodes 701 to 715 are presented to the user as a process tree, the information is stored in the form of a table 900 shown in FIG. 9. Each node has a unique identification within the scene as given in column 901. The type of node is given in column 904 and its name, which by default is the type of node but can be changed by the user in order to help him navigate the process tree, is given at 905. Columns 902 and 903 respectively give the children and parents of each node.

For example, as shown in row 906 the node identified as 0001 is node 701. It has children nodes identified as 0002 and 0015, which are nodes 702 and 715 respectively. As shown in rows 907 and 908, nodes 0002 and 0015 both identify node 0001 as their parent. The table 900 must always be self-consistent in this way.

It will be appreciated by the skilled user that the example described with reference to FIGS. 6 to 9 is for illustrative purposes only. A real process tree typically comprises thousands of nodes.

In the example herein described the project being worked upon is a commercial. In order to save costs the same commercial is often used around the world but with different languages. Additionally, different versions are often shown on television and in cinemas. In this example scene 602 is aimed at the United States television market. However, versions are also required for television in the United Kingdom and for the cinema in both countries and also in France and Spain. Thus the drinks label, the text and the voiceover must be changed and for the cinema versions a different foreground frame is used which reflects the higher age of the audience.

In prior art systems, in order to create the separate versions the user would copy the scene five times and change the input to nodes 705, 708, 710 and 703 in each one as required. If the user is then required by the client to make changes, for example if the colour correction by node 715 is not right, this change must be made separately in each version. Additionally, each version of a scene takes up space in the display of all scenes in a project on his VDU, known as a desktop area. When a user is producing several different versions of many scenes he must be very organised to avoid making mistakes, since it is not possible to immediately see how many different versions there are of a scene and in a cluttered desktop scenes overlap and may be missed. Finally, when the user has completed his editing he must render each different version of a scene separately.

FIG. 10

Figure 10:
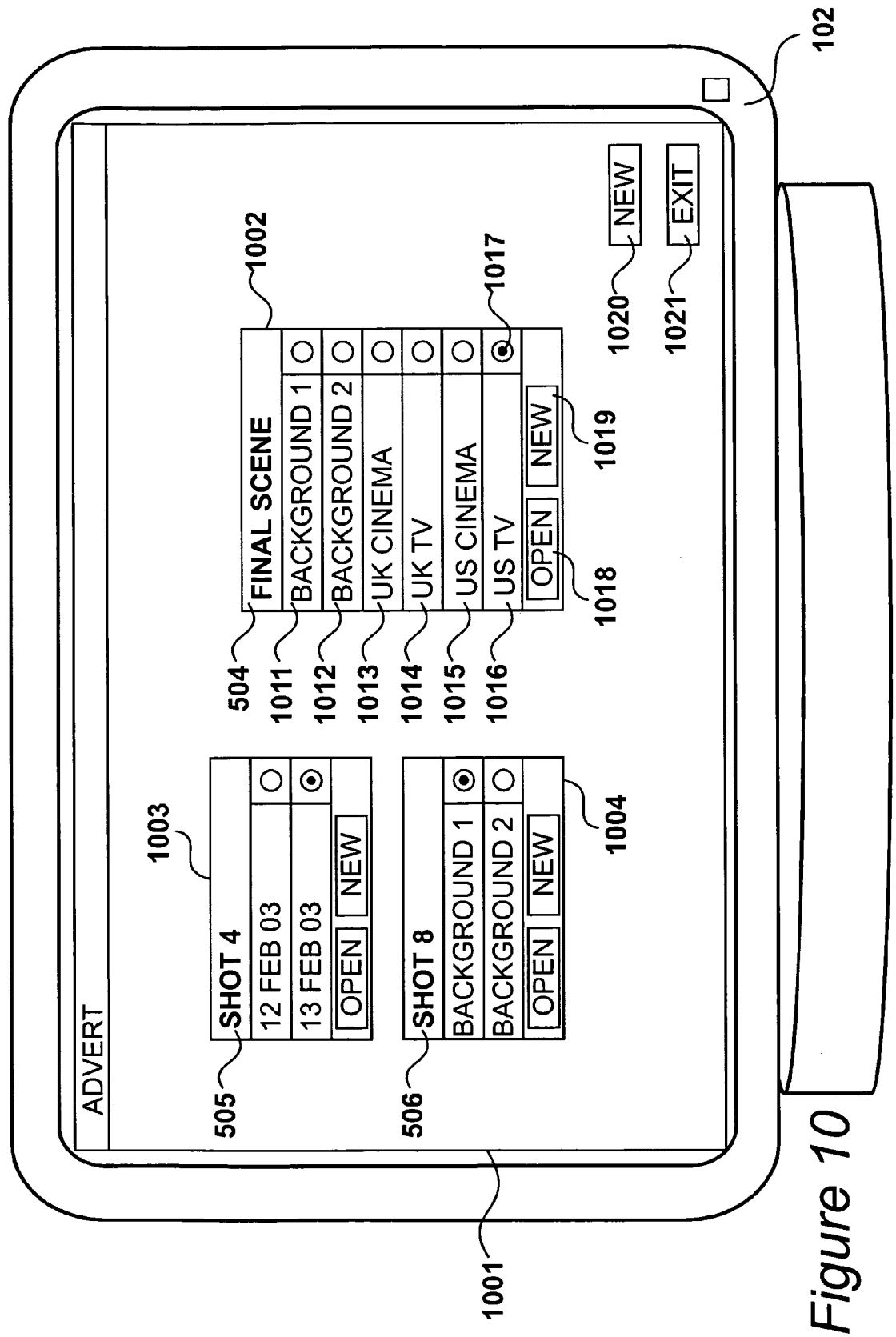
FIG. 10 illustrates a GUI on the VDU shown in FIG. 1 comprising a desktop.

FIG. 10 illustrates a desktop area displayed on VDU 102. As shown in FIG. 5, project 501 contains three scenes, each of which is graphically represented in desktop 1001 by a scene box. Scene 504 is represented by box 1002, scene 505 by box 1003 and scene 506 by box 1004. Each box lists the versions of that scene that are available, for example the six different versions of the final scene of the commercial are listed at 1011, 1012, 1013, 1014, 1015 and 1016. Each version has a radar button assigned to it and for each box a single button must be selected to represent the current version, so for example radar button 1017 is selected, indicating that version 1016, named "US TV", is the current version of scene 504. Selecting a different radar button will automatically de-select the previous current version and update the versions table for that scene, which will be described with reference to FIG. 13.

Within this desktop the user has several options. Each of scene boxes 1002 to 1004 has two control buttons. For example, box 1002 includes control button 1018 and button 1019. If the user selects control button 1018 the current version of scene 504, as indicated by the state of the radar buttons, is opened. If he selects control button 1019 a new version of the scene is created that is identical to the current version. For example, if button 1019 were pressed at the present time version 1016 would be copied and the new version named "VERSION 7". The user can therefore select a current version of any of the scenes, create new versions of any of the scenes or open a version of a scene. The user can also rename or delete scenes by activating a menu using a right mouse click.

Additionally, control button 1020 creates a new scene that has no nodes in it but one version, named by default as "VERSION 1". Control button 1021 exits the desktop area.

It will be apparent to the skilled user that the GUI shown here is only one way of presenting the required information. Any method of organising versions within scenes, indicating a current version and performing basic operations on versions, such as creating, opening, renaming and deleting, would fulfil the present invention.

FIG. 11

Figure 11:
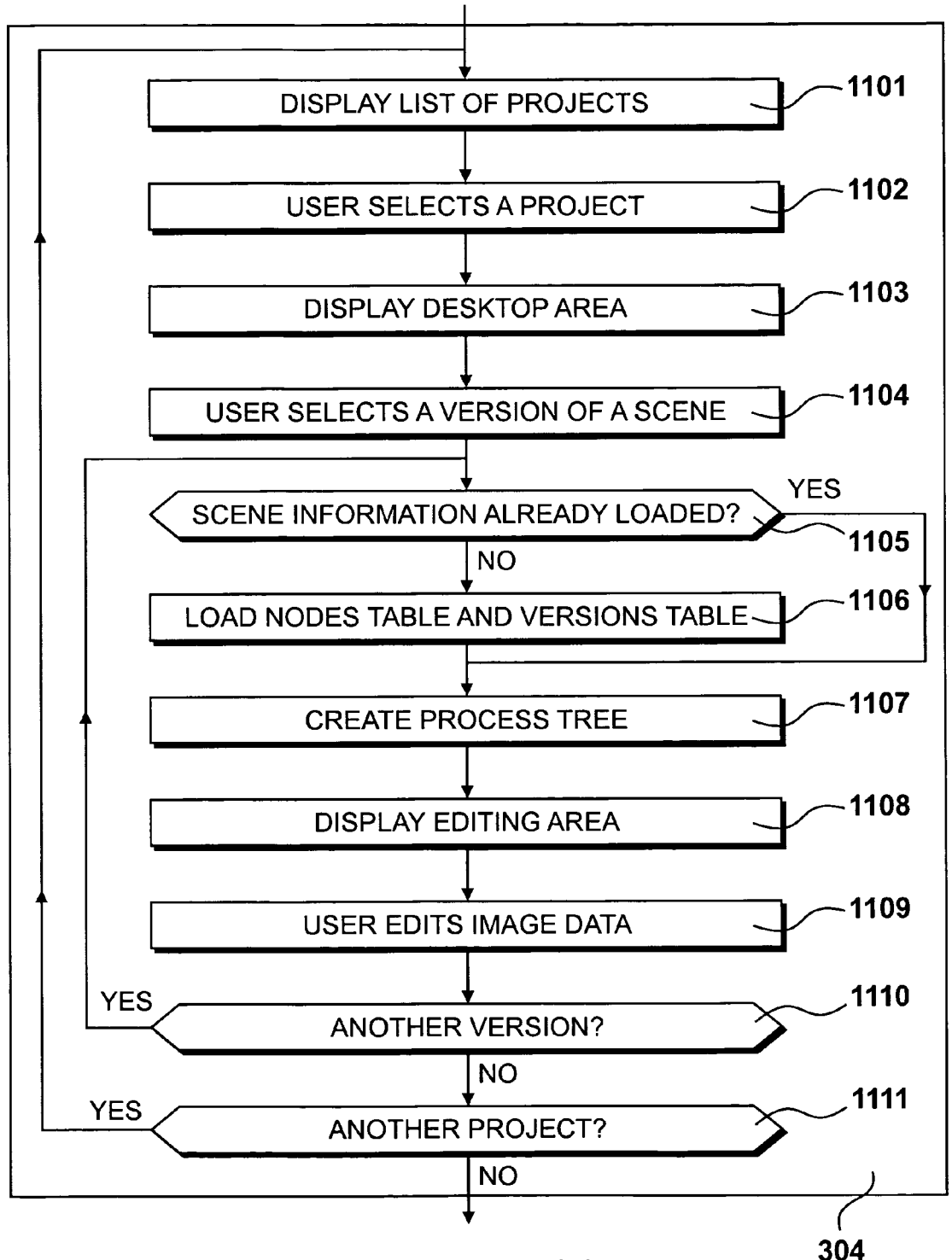
FIG. 11 details steps carried out during FIG. 3 to edit image data.

FIG. 11 shows step 304 of application 404 which implements this embodiment of the invention. At step 1101 the list of projects, as shown in FIG. 5, is displayed to user and at step 1102 the user selects a single project. At step 1103 the desktop area shown in FIG. 10 is displayed to the user and at step 1104 the user selects a version of a scene. During this step, while the desktop is displayed, he may also create new versions or scenes, select current versions, rename versions or delete versions, according to the necessity. However, he must eventually open a single version of a scene.

At step 1105 a question is asked as to whether the main structure for the scene, that is the nodes table and versions table, is already loaded. On the first iteration of step 1105 it will be answered in the negative and so at step 1106 the two tables are loaded. At step 1107 the data in these tables is used to create a process tree and at step 1108 an editing area that includes the process tree is displayed. This will be further described with reference to FIG. 15.

At step 1109 the user edits the scene. This step is terminated by a return to desktop area 1001. At step 1110 a question is asked as to whether the user requires to edit more image data in this project. If this is answered in the affirmative by the user selecting a version of a scene then control is returned to step 1105. If the selected version is a version of the same scene as was previously edited then the question asked at step 1105 is answered in the affirmative and step 1106 is skipped since the tables for that scene are already loaded.

If the question asked at step 1110 is answered in the negative by the user selecting control button 1021, the user is then asked at step 1111 if he wishes to edit another project. If the question is answered in the affirmative then control is returned to step 1101. If it is answered in the negative then step 304 is concluded and the application terminates with the powering-down of the processing system at step 305.

Thus step 304 differs from similar steps carried out by prior art systems in that instead of opening and editing a scene, the application opens and edits a version of a scene. Certain changes made to that version during editing will be seen in all other versions and other changes will be specific to that version. The user has complete control over this. Additionally, since there is only one nodes table for each scene, regardless of how many versions it has, all versions can be rendered simultaneously.

FIG. 12

Although the prior art process tree shown in FIG. 7 can still be created using application 402, the full functionality of the invention can be achieved by using switch nodes. These are nodes that have a number of children but, unlike a standard node, pull image data from only one child. This child is called the designated child node and the remainder of the nodes are not processed, nor are the branches of undesignated child nodes. The user inserts switch nodes wherever one version of a scene should differ from another.

Figure 12A:
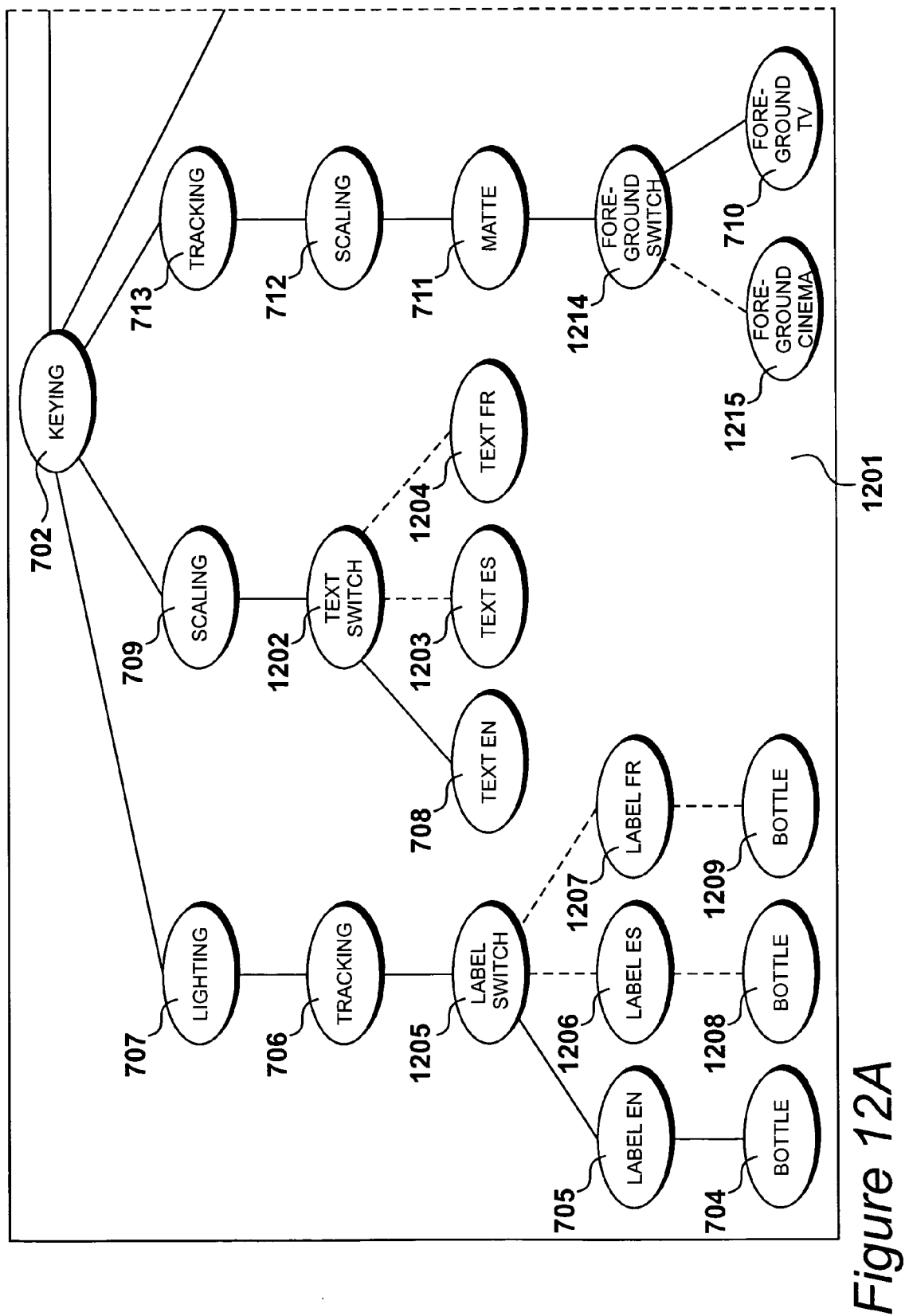
FIGS. 12A and 12B illustrate a process tree.
Figure 12B:
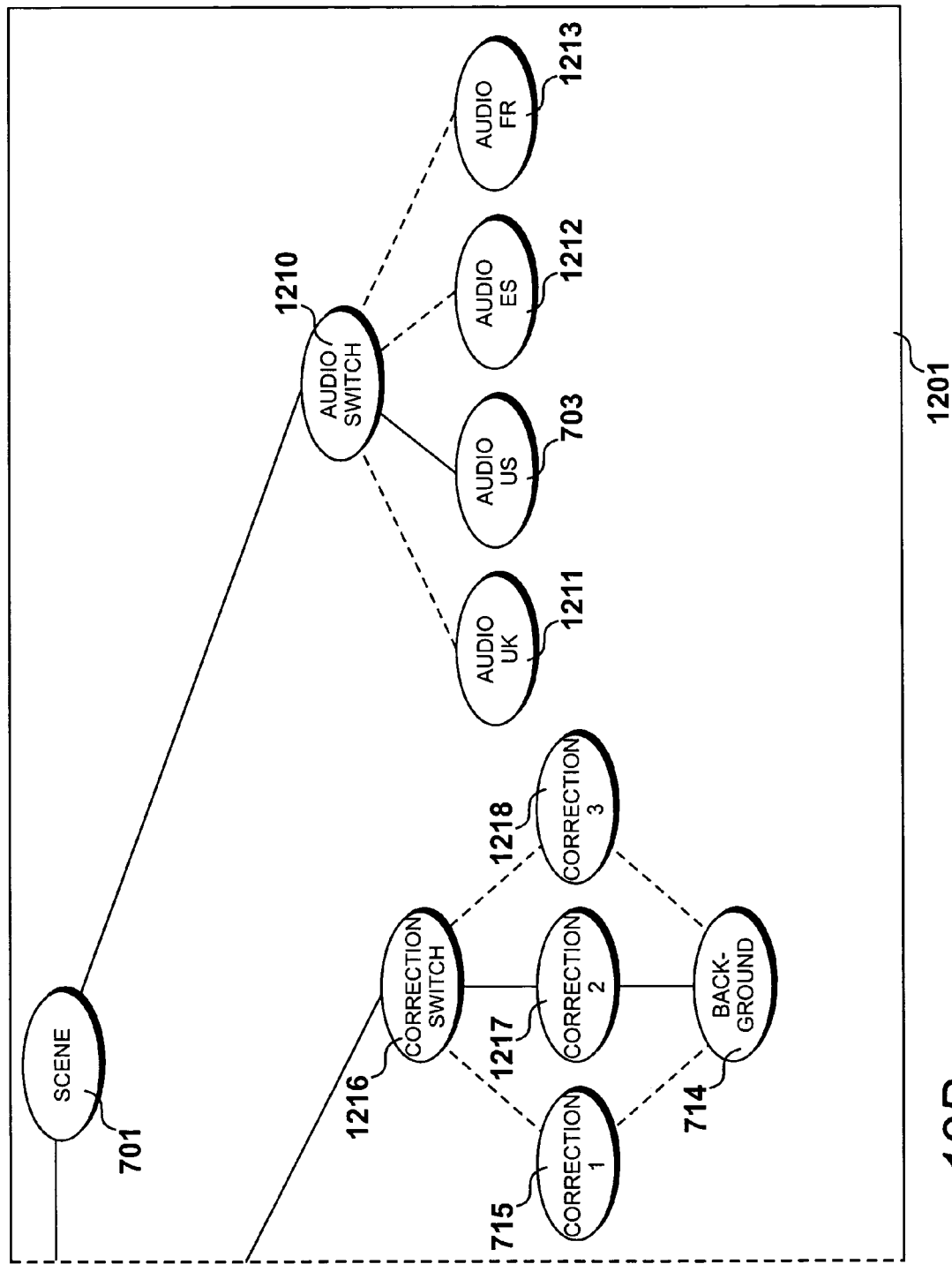

FIG. 12, consisting of FIG. 12A and FIG. 12B, shows the process tree of FIG. 7 which has been edited further to include switch nodes and alternative labels, text, voiceovers and frames to fulfil the needs of the different versions of the commercial required.

Thus, process tree 1201 includes all of nodes 701 to 715, some of which have been renamed by the user for ease of use. Additionally, a number of switch nodes have been added. Node 1202 is a switch that pulls input from only one of nodes 708, 1203 or 1204, these latter two being text 805 translated into Spanish and French respectively. The unbroken line connecting nodes 1202 and node 708 indicates that node 708 is the designated child, whereas the dashed lines joining the switch to the undesignated nodes 1203 and 1204 indicate that these nodes will not be processed.

Node 1205 is a switch that pulls input from only one of nodes 705, 1206 and 1207, these latter two being label 801 translated into Spanish and French respectively. Node 1206 pulls 3D information from modelling node 1208, while node 1207 pulls 3D information from modelling node 1209. Each of nodes 704, 1208 and 1209 produces an identical bottle 801, but only one is processed according to which of nodes 705, 1206 and 1207 is the designated child of switch node 1205.

Similarly, switch node 1210 pulls audio data from only one of nodes 703, 1211, 1212 and 1213. Node 1211 pulls an audio file that contains the same words as those in sound data 814 but with an English accent. Nodes 1212 and 1213 pull voiceovers in Spanish and French respectively.

Switch node 1214 pulls a frame from either node 710 or node 1215 according to whether the commercial is destined for the television or the cinema.

Finally, switch node 1216 pulls RGB data from one of nodes 715, 1217 and 1218. In this case node 715 has been "shallow copied" to create nodes 1217 and 1218, which means that instead of duplicating the branch of node 715 links were created between the new nodes and the child node 714 of node 715. The corrections carried out by nodes 1217 and 1218 were then altered to give three different effects. This means that whichever of the three nodes is processed, node 714 is also processed. This differs from the alternatives available to switch node 1205. In that case node 705 was copied in the normal way, causing node 704 to be duplicated also, before the textures pulled by nodes 1206 and 1208 were altered. Switch 1216 is an example of where the user inserted alternatives to try out before deciding on the colour correction produced by node 1217. Using switch nodes the user can quickly show the different effects produced by each without changing the colour correction parameters again and again, as would be necessary in prior art systems. In this example the same colour correction is used in all six versions.

In process tree 1201 all the switches are set to produce a final scene suitable for a commercial for US television since, as shown by FIG. 10, version 1016 is the current version. If, for example, the process tree shown in FIG. 7 were created first then in order to create the further five versions the user would simply duplicate that version, which at that point would be the only version, insert switches and new nodes and change the designated children of the switches as required. For example, to create version 1014 for UK television the user would select version 1016 as the current version, press control button 1019 to create a new version based on version 1016, open the new version, create node 1211 and change switch 1210 such that node 1211 is the designated child.

If changes need to be made after all the versions are created, for example the client wishes bottle 622 to be lit differently, the lightmap 804 pulled by node 707 can be changed in any of the versions. This change will then show in all the versions. If the client only wishes it to be changed in some versions then a switch can be inserted to choose between the alternatives. The user then only needs to make sure that the switch is set correctly in each of the versions.

Thus the user has complete control over whether a change to a scene affects all versions or only some of them.

FIG. 13

FIG. 13 shows part of nodes table 510, which contains the information necessary to produce process tree 1201. It is similar to prior art table 901 except that "SWITCH" is now an option for node type, and each node can have more than one parent, which was not previously possible. For example, row 1301 gives information for the node with the ID 0016, which is switch node 1205. All the children of node 1205 are listed, but whereas in the prior art all of them would be processed, the versions table, which will be described with reference to FIG. 14, gives the designated child to be processed.

Row 1302 gives information for the node with ID 0014, which is node 714. This node has three parents, namely nodes 715, 1217 and 1218, but its data will be pulled by only one of them.

FIG. 14

FIG. 14 shows versions table 511, which contains the versions information for process tree 1201. Column 1401 lists the names of the six versions 1011 to 1016 of scene 504 and column 1402 shows which one is current. This is changed whenever the user selects one of the radar buttons in box 1002 in desktop display 1001.

Columns 1403 to 1407 list the states of all the switch nodes in the scene for each version. The state of a switch in a particular version is the designated child of the switch for that version. For example, column 1403 is for node 1205, which has ID 0016. As shown in that column, for versions 1013 to 1016 the designated child is the node with ID 0005, which is node 705 that pulls a texture of a label in English. For version 1011 the designated child is node 1206, which has ID 0019, and for version 1012 the designated child is node 1207, which has ID 0017.

Similarly, column 1404 gives the state of switch node 1210 for each version, column 1405 gives the state of switch node 1202 for each version, column 1406 gives the state of switch node 1214 for each version, and column 1407 gives the state of switch node 1216 for each version. In the latter case the switch is the same for every version. The user could in these circumstances delete the switch node and the undesignated child nodes but there is no necessity for this.

Thus the processing system 101 is configured to receive, via either keyboard 104 or stylus 105, data indicating a change in state of one or more switch nodes, and store, on either RAID 103 or hard disk 212, versions table 511 that gives information recording the states of said switch nodes that defines a version of said image data.

The skilled reader will understand that nodes table 510 and versions table 511 are only examples of ways in which the necessary information can be stored. With reference particularly to the versions table, any method of storing the designated child for each switch for each version, preferably along with data indicating which version is current, would fulfil the present invention. It is also envisaged that other types of switch node could be used, for example ones which function as an AND/OR gate or accept input from a specified number of child nodes rather than just one. In these cases the information would of necessity be stored differently, however the states of each switch would still be recorded for each version.

FIG. 15

Figure 15:
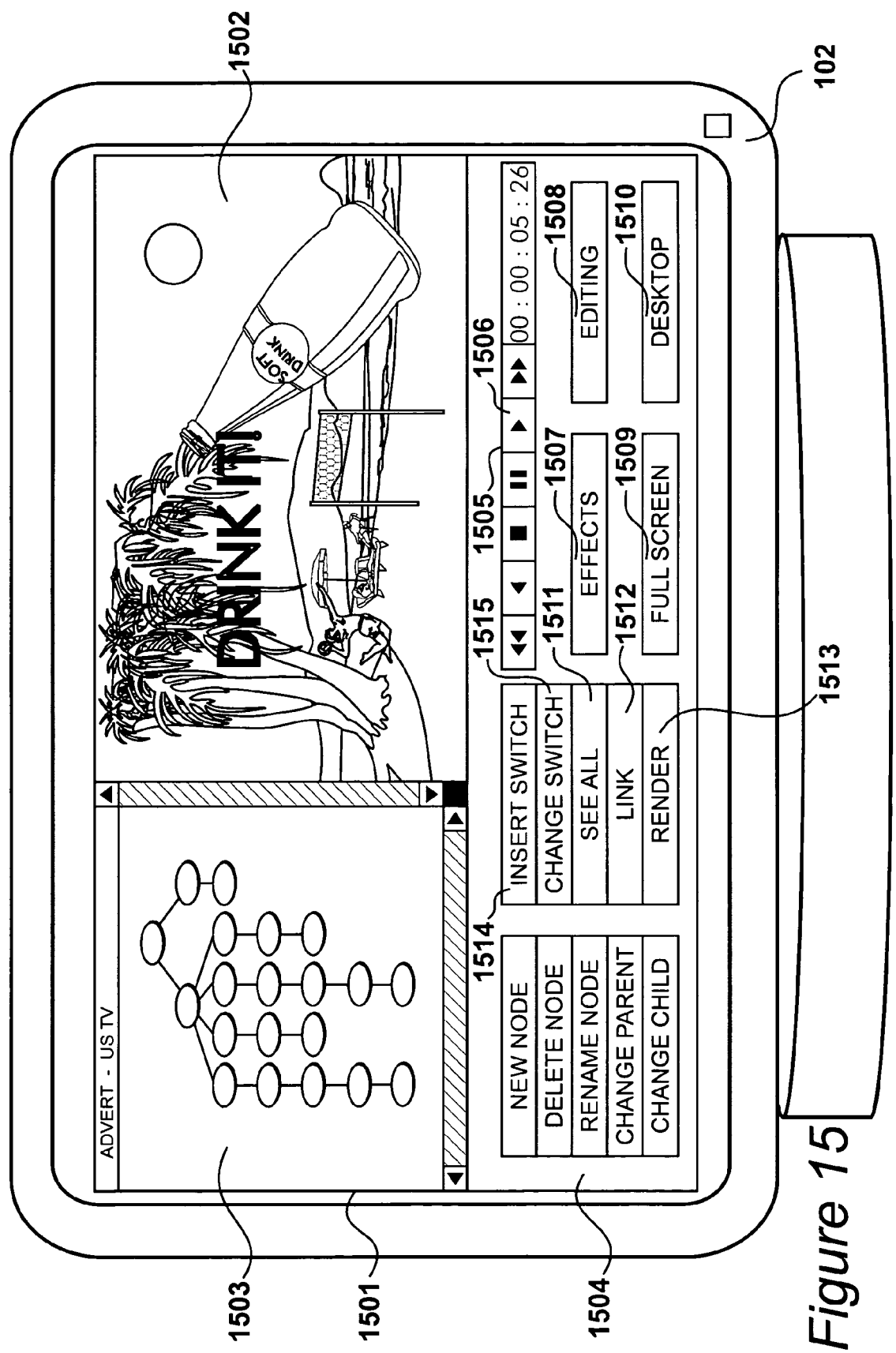
FIG. 15 illustrates a second GUI that allows the user to edit image data.

FIG. 15 shows a second GUI 1501. It contains three areas. The first contains image data 1502 produced by processing the process tree of version 1016 of scene 504, ie process tree 1201. The second area 1503 contains process tree 1201 that has been pruned. This will be described further with reference to FIG. 16.

Area 1504 contains various control buttons, including navigation controls 1505 which includes "play" button 1506. Buttons 1507 and 1508 activate further menu systems which allow effects and editing operations respectively. Button 1509 activates a full screen display as shown in FIG. 6 and button 1510 returns to desktop display 1001 when the user has finished editing a version.

The remaining buttons relate to editing of the process tree and offer functionality such as creating a new node, deleting or renaming a node and changing the links between nodes. These functions are implemented by making changes to nodes table 510. For example, creating a new node involves adding a new row to the nodes table, adding its ID to its parent's child list and adding its ID to its children's parent lists. Deleting a node involves the same process in reverse, since a row is deleted and its ID is removed from its parents' child lists and its children's parent lists. Renaming a node simply involves changing the entry in column 905 and changing links involves creating new entries and deleting old entries from parent and child lists. The nodes table is always self-consistent, that is wherever a first node ID appears in a second node's parent list, the second node ID appears in the first's child list, and vice versa.

The remaining buttons relate to functions relevant to this embodiment of the invention. Button 1511 displays the full process tree 1201. Button 1512 allows links to be created between scenes, for example when a clip of frames is to be displayed on a television screen within another scene. The user can choose which version of the linked scene is to be used. Button 1513 starts a render process, during which the user will be prompted to select which versions of the scene should be rendered. Button 1514 inserts a switch as a parent of a selected node and button 1515 changes the designated child for a selected switch.

FIG. 16

Figure 16:
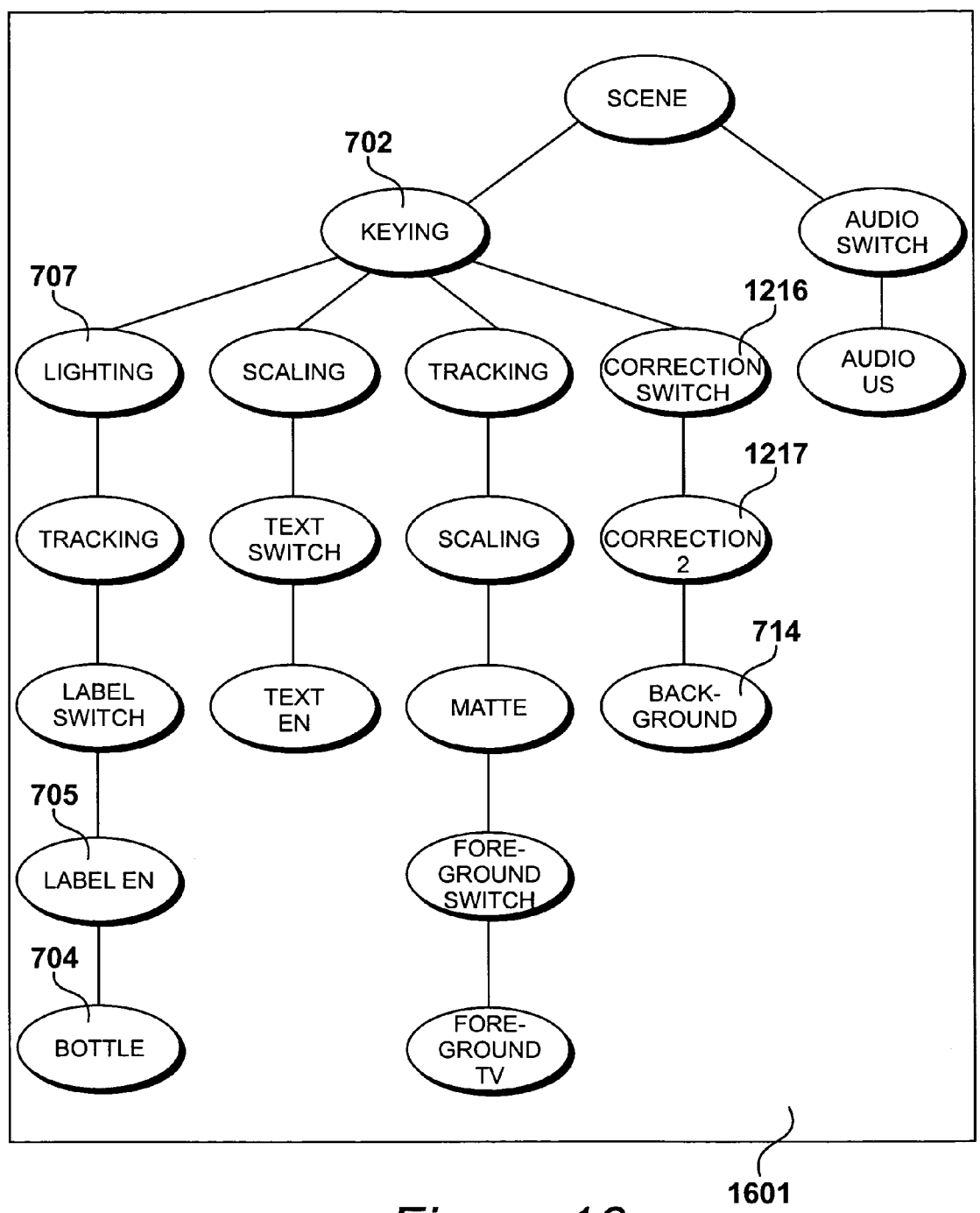
FIG. 16 illustrates the process tree shown in FIGS. 12A and 12B pruned to remove undesignated children of switch nodes.

FIG. 16 shows process tree 1601 pruned to exclude all the undesignated child nodes of switches, and also their branches, according to version 1016 as shown in area 1503. Thus process tree 1601 does not include nodes 1206 or 1207, nor their children 1208 and 1209. Similarly it does not include nodes 1203, 1204, 1211 to 1213, 1215, 715 or 1218. However, it does include node 714, because although it is a child of unincluded nodes 715 and 1218, it is also a child of node 1217 which, in version 1016, is the designated child of switch node 1216.

Process tree 1601 is displayed to the user in area 1503 of GUI 1501 because it is easier to navigate than process tree 1201. However, the user may see the entire tree by selecting button 1510. This is usually done when changing the states of switches.

FIG. 17

Figure 17:
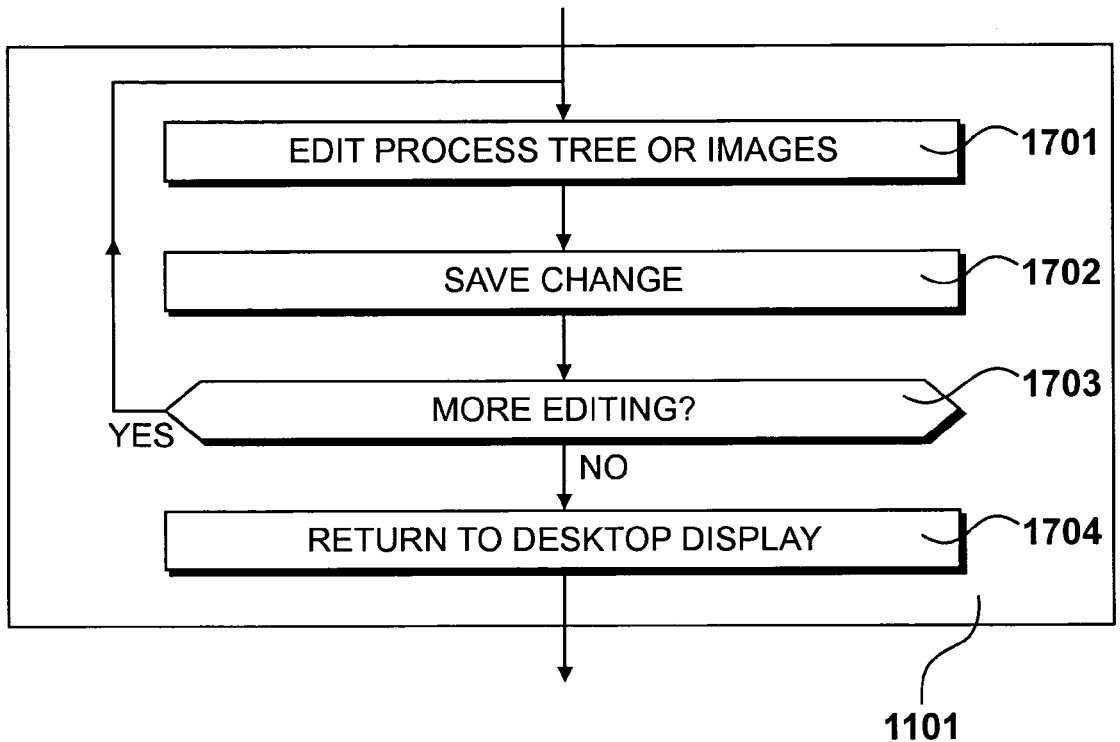
FIG. 17 details steps carried out during FIG. 11 to perform editing of image data using the GUI shown in FIG. 15.

FIG. 17 details step 1101 at which image data as displayed in GUI 1501 is edited by the user. At step 1701 the user makes a change to the image data, either by editing the process tree in area 1503 or directly on the image 1502. This can be done using any of the functions available to the user in area 1504, excepting navigation controls 1505 but including those accessed via control buttons 1507 and 1508. When a change has been made it is saved at step 1702. In this embodiment all changes are automatically saved as soon as they are made. This gives rise to a further use for versioning which will be described in reference to FIGS. 24 to 26.

At step 1703 a question is asked as to whether more editing is to be carried out. This is answered in the affirmative by the user selecting a control button, in which case control is returned to step 1701, and in the negative by the user selecting button 1510 to return to the desktop display at step 1704.

FIG. 18

Figure 18:
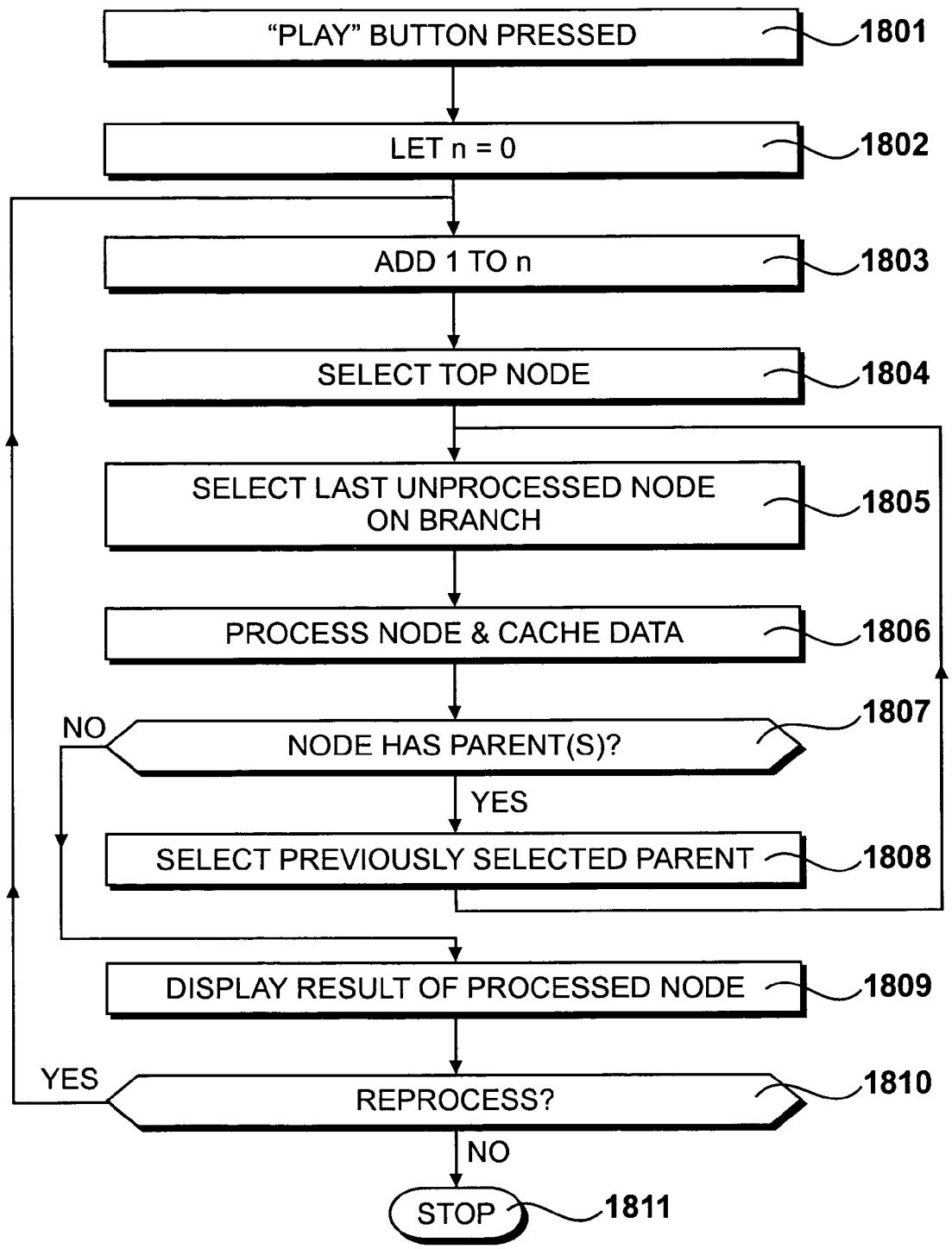
FIG. 18 illustrates a function carried out to display image data when a button in GUI shown in FIG. 15 is selected.

FIG. 18 shows the function called when play button 1506 is selected by the user. This results in the scene as shown in area 1502 being played in its entirety. The buttons for fast forward, reverse play and rewind call functions that operate in a similar manner except that the frames are called in reverse order or with some missed out as is necessary.

At step 1801 button 1506 is pressed and at step 1802 a parameter n is set to zero. At step 1803 n is incremented by one and at step 1804 the top node in the process tree, easily identified as the only one without a parent, is selected.

At step 1805 the last unprocessed node on the branch of the top node is selected. As previously described with reference to FIG. 7, a node cannot be processed until all its child nodes have been processed and so the procedure starts at the bottom of the process tree. For example, when playing version 1016 of scene 504, which has process tree 1601, the last unprocessed node is modelling node 704. At step 1806 the selected node is processed and the data is cached.

At step 1807 a question is asked as to whether this node has parents. On every iteration except the final one this question will be answered in the affirmative and at step 1808 the node's parent is selected. If a node has only a single parent this is simple, for example after processing node 704 node 705 is selected. However, node 714 has three different parents. During the iteration of step 1805 in which node 714 is selected, which will be further described with reference to FIG. 19, node 1217, as the designated child of switch node 1216, will have been selected and nodes 715 and 1218 will not have been selected (see FIG. 12). Therefore, if a node has more than one parent it is the node that has been previously selected during an iteration of step 1805 that is selected.

At this point control is returned to step 1805 and the last unprocessed node on the branch of the selected node is selected. For example, when node 705 is selected, following the processing of node 704, then it itself is the last unprocessed node on its own branch and so the selection of node 705 remains. However, for example, when node 707 is processed its parent 702 is selected on this iteration of step 1805, and the last unprocessed node on node 702's branch is node 708.

Further iterations result eventually in node 702 being processed, at which point node 701, as its parent, is selected and the last unprocessed node of 701 is node 703. On the final iteration node 701 is itself processed and the question asked at step 1807 as to whether the node has a parent is finally answered in the negative. At this point the result of the processed node is displayed at step 1809 and at step 1810 a question is asked as to whether a reprocess is called. This will be answered in the affirmative until the final frame of the scene has been displayed to the user. If answered in the affirmative then control is returned to step 1803 and n is incremented. Variable n is used to indicate the number of frames which have been processed and thus the number of the next frame to pull. Eventually, the question asked at step 1810 is answered in the negative and the function stops at step 1811.

FIG. 19

Except for the method of selecting a node's parent at step 1808, the function outlined in FIG. 18 is that which would be used by a prior art system to process a process tree such as that shown in FIG. 7. However, in the current embodiment the details of step 1805 are different because of the switch node. Step 1805 is therefore detailed in FIG. 19.

At step 1901 a question is asked as to whether the selected node has unprocessed children. On the first iteration of step 1805 the selected node is the top node, and on further iterations it is always the parent of the previously processed node. Thus, if this question is answered in the negative then either the selected node has no children and is at the end of the branch, or its children have already been processed and so it itself can now be processed. Thus in this case step 1805 is concluded and the node is processed at step 1806.

If however this question is answered in the affirmative, to the effect that the selected node does have unprocessed children, then at step 1902 another question is asked as to whether the selected node is a switch node. If this question is answered in the negative then the next unprocessed child of the selected node is selected in the normal way. However, if it is answered in the affirmative then it may have unprocessed children that should not be processed because they are undesignated. Thus, at step 1904 the question is asked as to whether a child node of the selected switch node has been processed. If this question is answered in the affirmative then the remainder of the children of the switch node are not to be processed and thus the parent of the switch node, or its previously selected parent if it has more than one, is selected at step 1905. A switch node is never itself processed in the normal way because no function is associated with it. It simply routes the flow of data.

If the question asked at step 1904 is answered in the negative, to the effect that a child node of the selected switch node has not been processed, than at step 1906 the designated child of the switch node is identified from versions table 511 and at step 1907 this node is selected.

Figure 19:
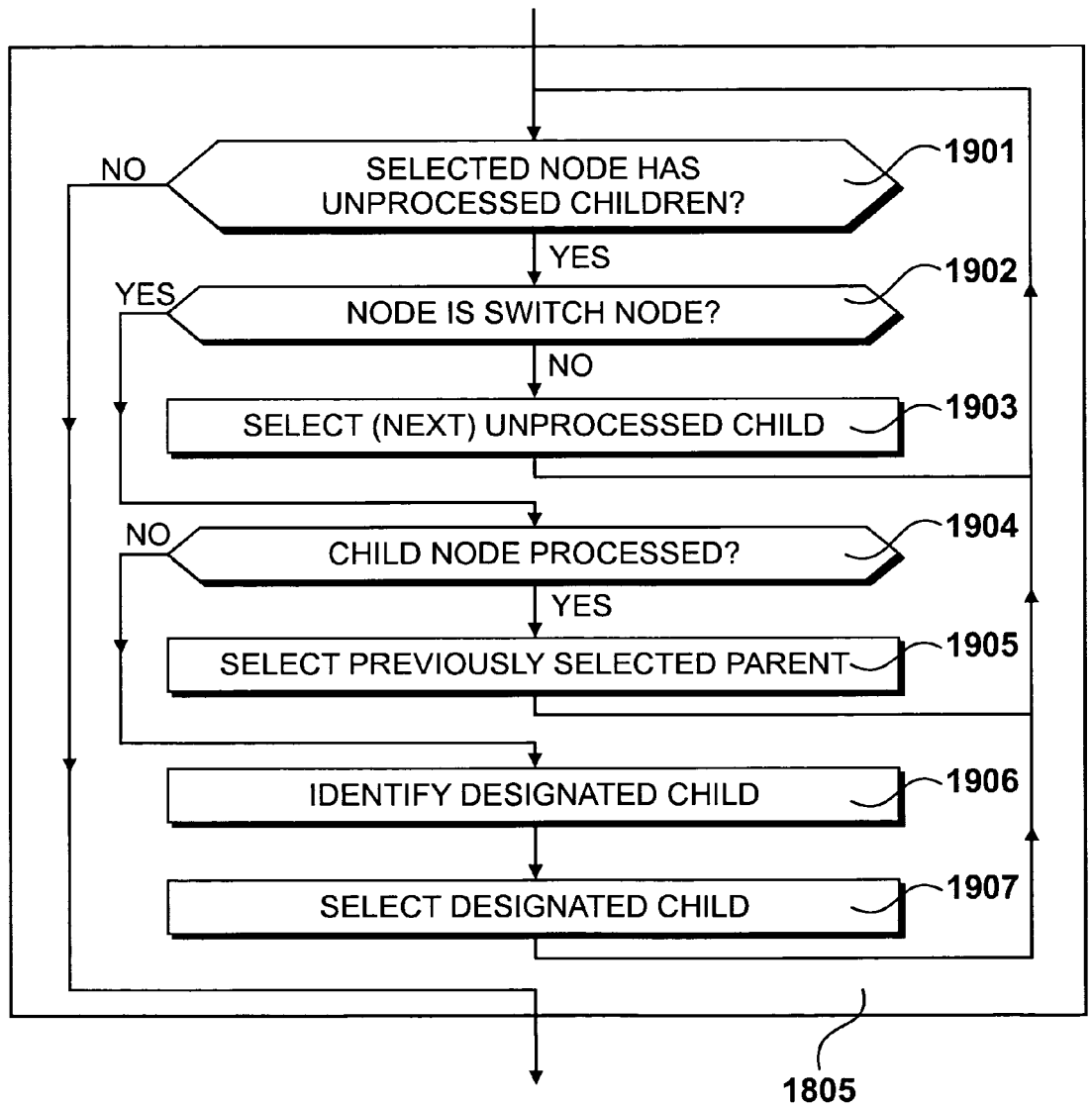
FIG. 19 details steps carried out during FIG. 18 to select a node in a process tree to be processed.

On completion of any of steps 1903, 1905 or 1907 control is returned to step 1901 and the question is again asked as to whether the selected node has unprocessed children. In this way, the last unprocessed node on a branch is selected at step 1805. The procedure described with reference to FIGS. 18 and 19 is also followed when a version of a scene is rendered.

FIG. 20

Figure 20:
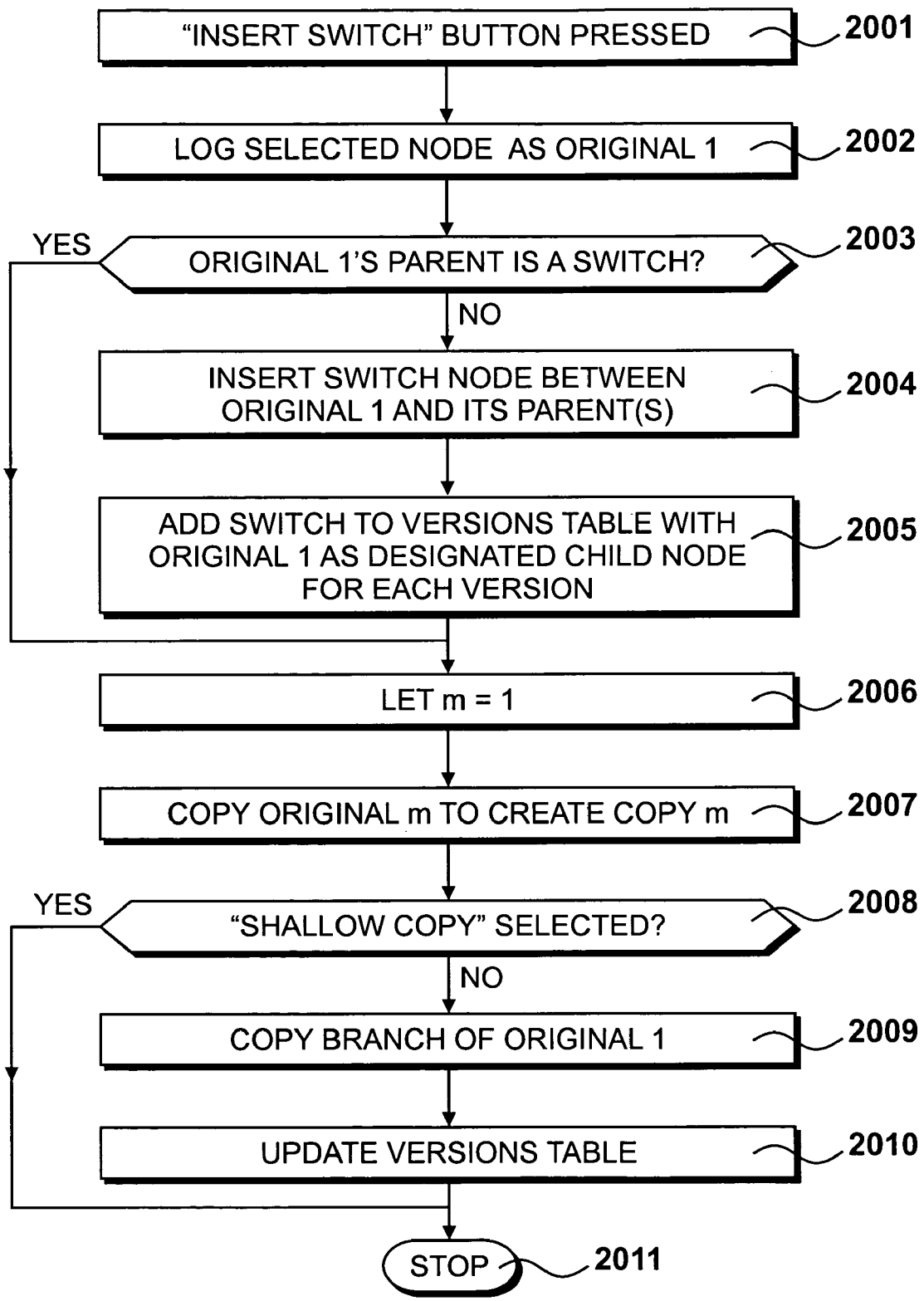
FIG. 20 details a function to insert a switch carried out when a button in the GUI shown in FIG. 15 is selected.

FIG. 20 shows the function that is called when the user selects control button 1514 that inserts a switch. This button is available when a node of the process tree as shown in area 1503 is selected and has the effect of inserting a switch above this node and copying the node. Unless the command is modified by holding down a particular key on the keyboard, to indicate that a shallow copy is required, the branch is copied as well. In the case where the selected node already has a switch as a parent, the selected node is simply copied, with or without its branch, without inserting another switch.

At step 2001 the insert switch button is pressed, and at step 2002 the selected node is logged as ORIGINAL 1. At step 2003 a question is asked as to whether the parent of ORIGINAL 1 is itself a switch. If this question is answered in the negative then at step 2004 a switch node is inserted between ORIGINAL 1 and its parent. This is done in the same way as any normal node would be inserted. At step 2005 the switch is added to the versions table with the node ID of ORIGINAL 1 as the designated child node for each version.

If the question asked at step 2003 is answered in the affirmative, to the effect that the parent of ORIGINAL 1 is a switch, then steps 2004 and 2005 are bypassed.

At step 2006 a variable m is initially set to 1 and at step 2007 ORIGINAL m, which at this point is ORIGINAL 1, is copied to create COPY m, which at this point is COPY 1.

At step 2008 a question is asked as to whether the insert switch command has been modified to indicate that a shallow copy is required. If this question is answered in the affirmative then the function terminates at step 2011, but if it is answered in the negative then at step 2009 the entire branch of ORIGINAL 1 is copied and appended to COPY m. At step 2010 the versions table is updated if the branch of ORIGINAL 1 contains any switches, since of course they will have been copied, and at step 2011 the function stops.

An example of a shallow copy is seen in process tree 1201 at nodes 1217 and 1218. To create these nodes, nodes 715 was selected and the insert switch button 1514 was pressed while a modifier key was held down on keyboard 104. Switch node 1216 was inserted between nodes 715 and 702 and it was added to versions table 511. Node 715 was then copied to create node 1217. Referring to nodes table 510 in FIG. 13, the ID of node 715 is 0013 which has parent node 0030, which is switch node 1216. As a child it has the node with ID 0014, which is node 714. Node 1217 has ID 0031 and can be seen that it has exactly the same child and parent as node 715. Thus create a shallow copy it is enough to create a new row in the nodes table that is a direct copy of the row for the selected node, except with a different ID. The user can then rename the new node and change its parameters as he wishes. To create node 1218 exactly the same process was carried out, but because at that point the parent of node 715 was itself a switch no new switch was inserted.

FIG. 21

Figure 21:
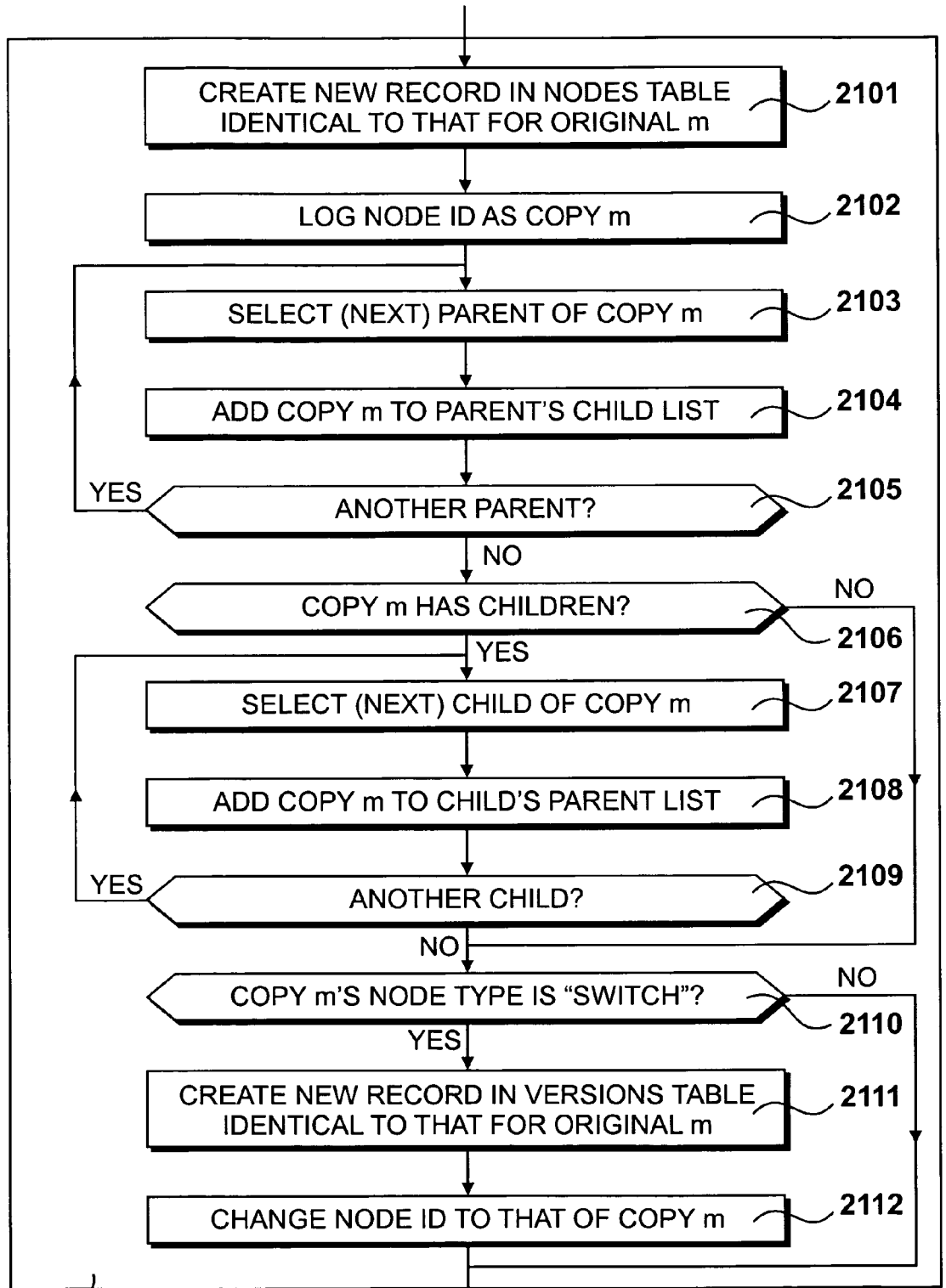
FIG. 21 details steps carried out during FIG. 20 to copy a node.

FIG. 21 details step 2007 at which the node logged as ORIGINAL m is copied to create a node logged as COPY m. At this point m equals 1 but this step is also carried out during step 2009, which is detailed in FIG. 22, during which m may be any positive integer.

At step 2101 the record in nodes table 510 for the node logged as ORIGINAL m is copied. The copy is identical to the original except it has a different node ID. At step 2102 the node ID is logged as COPY m.

At step 2103 the first listed parent of COPY m is selected and the node ID of COPY m is added to that parent's child list at step 2104. At step 2105 a question is asked as to whether the node has another parent and if this is answered in the affirmative then control is returned to step 2103.

If it is answered in the negative then at step 2106 a question is asked as to whether COPY m has children in its child list. If this question is answered in the affirmative then at step 2107 the first child of the node is selected and at step 2108 the node ID of COPY m is added to the child's parent list. At step 2109 a question is asked as to whether the node has another child and if this question is answered in the affirmative then control is returned to step 2107.

If either of the questions asked at step 2106 or 2109 is answered in the negative then at step 2110 a question is asked as to whether the node logged as COPY m is a switch. If this question is answered in the affirmative then at step 2111 a new record is created in the versions table that is identical to that for the nodes logged as ORIGINAL m and at step 2112 the node ID in the versions table for the new record is changed to the ID of COPY m.

At this point, and if the question asked at step 2110 is answered in the negative, step 2007 is concluded. At this point, the node logged as ORIGINAL m has been copied and the copy has both the same parent and the same children as the original. As previously discussed with reference to FIG. 20, if a shallow copy is required then the function is concluded. However, if, as is more normal, a shallow copy is not required, then the entire branch of ORIGINAL 1 must be copied and appended to COPY 1.

FIG. 22

Figure 22:
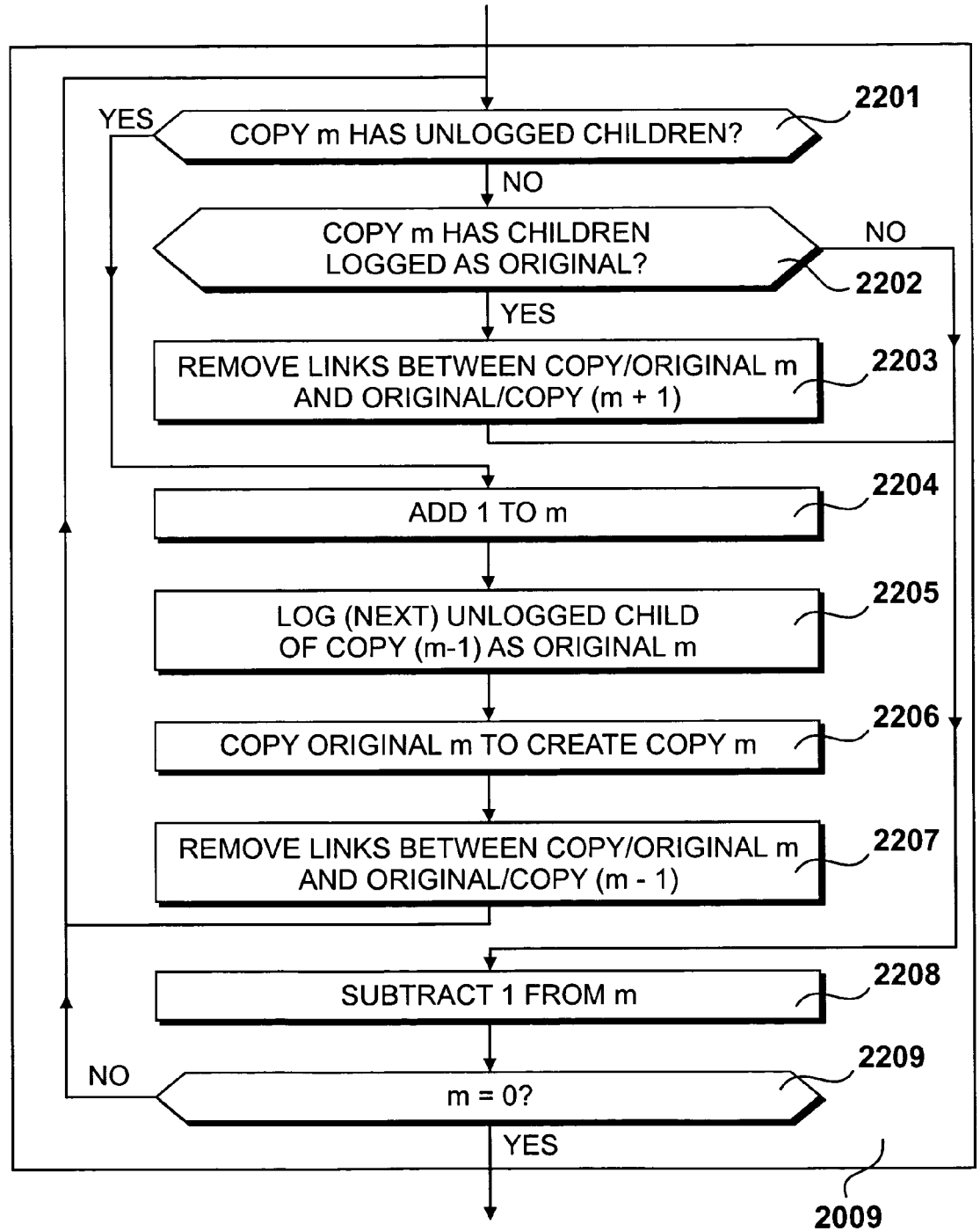
FIG. 22 details steps carried out during FIG. 20 to copy the branch of a node.

FIG. 22 details step 2009 at which the branch of ORIGINAL 1 is copied. At step 2201 the question is asked as to whether COPY m has unlogged children. Eventually, by the end of step 2009, every node in ORIGINAL 1's branch will have been logged as an original and every copy in COPY 1's branch will have been logged as a copy. However, on the first iteration of question 2201, unless ORIGINAL 1 has no children at all the question will be answered in the affirmative. In this case, m is incremented by 1 at step 2204 and at step 2205 the next unlogged child of the selected node, which is now COPY (m−1), is logged as ORIGINAL m. Thus, for example, a child of COPY 1 is logged as ORIGINAL 2.

At step 2206 ORIGINAL m is copied to create COPY m, thus for example ORIGINAL 2 is copied to create COPY 2, and at step 2207 the links are removed between COPY m and ORIGINAL (m−1), and between ORIGINAL m and COPY (m−1). Thus for example, on the first iteration COPY 1 is removed from ORIGINAL 2's parent list and ORIGINAL 2 is removed from COPY 1's child list. Additionally, ORIGINAL 1 is removed from COPY 2's parent list and COPY 2 is removed from ORIGINAL 1's child list. At this point, control is returned to step 2201 and the question is asked as to whether COPY m, which in this iteration is COPY 2, has unlogged children.

This iteration continues until the end of a branch is reached and at this point the question asked at step 2202 will be answered in the negative to the effect that COPY m does not have unlogged children, because it has no children at all. At step 2202 the question is asked as to whether COPY m has children logged as original. This circumstance only arises when the copied branch contains shallow copies, because then a node has more than one parent. Assuming that this question is answered in the negative then control is directed to step 2208 at which m is decremented by 1. At step 2209 the question is asked as to whether m now is equal to zero, which would mean that the iteration was concluded. However, if it is answered in the negative then control is again returned to step 2201 when the question is again asked as to whether COPY m has unlogged children. Thus, in effect, the parent of the previously selected node has been selected. If this node has more children that have not yet been copied further iterations are then required to copy those children. Eventually, when the entire branch has been copied, m will equal zero and step 2009 is concluded.

Variable m indicates how far down the hierarchy a node is from ORIGINAL or COPY 1, and thus the loggings of ORIGINAL m and COPY m are frequently reassigned to new nodes. In the case the replaced nodes are simply recorded as having been previously logged, either as a copy or an original.

If the copied branch does contain shallow copies then the circumstance will arise that links still exist between originals and copies, meaning that a copy whose branch has been entirely copied may still have an original node as a child. In this case at step 2203 the links are removed between COPY m and ORIGINAL (m+1) and ORIGINAL m and COPY (m+1).

Thus at the end of step 2009 the entire branch of the original node has been copied and appended to the copied node. It will be appreciated that this algorithm is only an example of how a branch could be copied. Other methods are encompassed by the present invention.

FIG. 23

Figure 23:
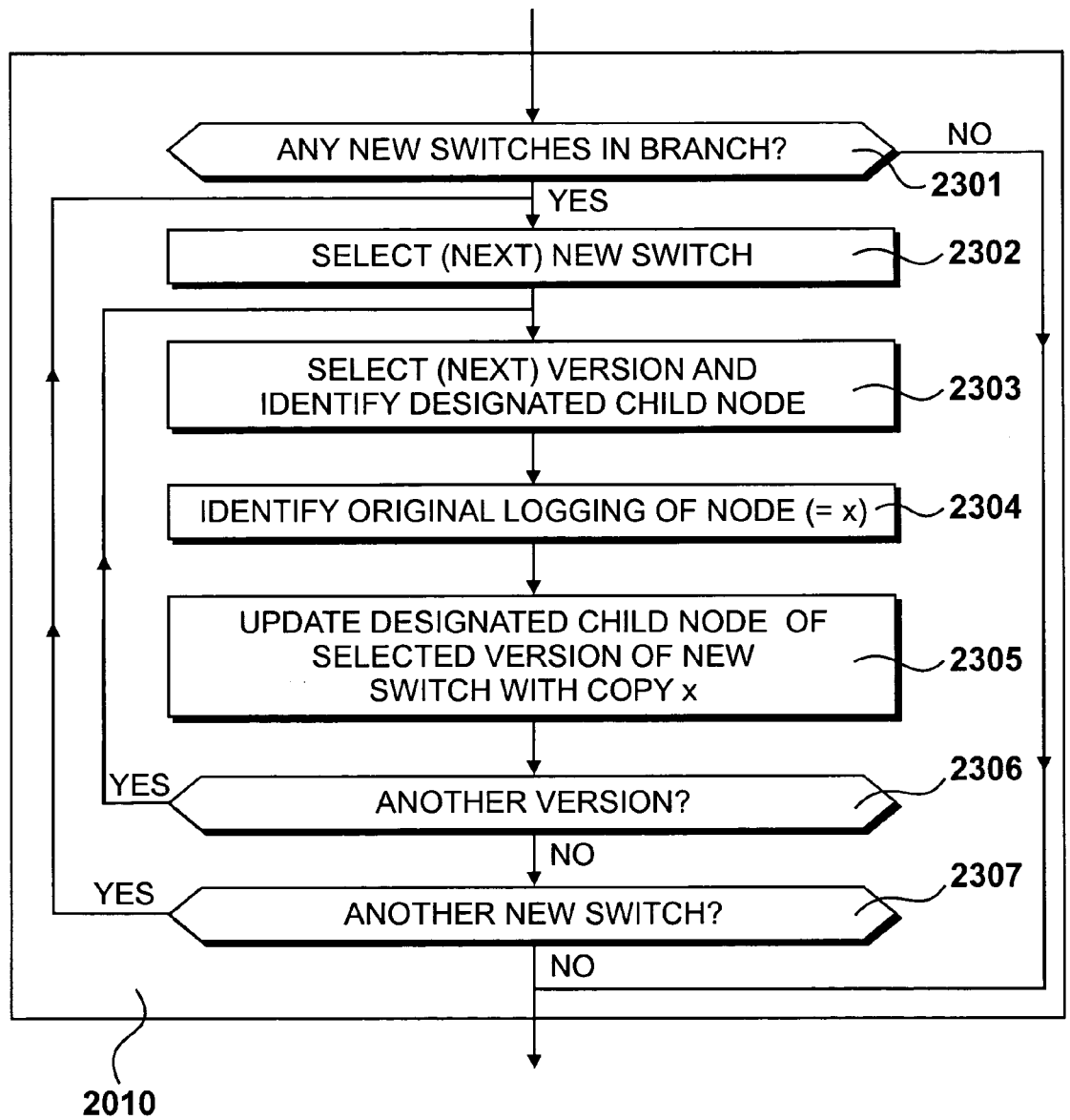
FIG. 23 details steps carried out during FIG. 20 to update the versions table shown in FIG. 14.

FIG. 23 details step 2010 at which the versions table is updated. At this point, although any switches occurring in the branch of the original node have been copied their entries in the version table still refer to the original switch's children, rather than those of the copy. Thus, at step 2301 a question is asked as to whether there are any new switches in the branch, and if this question is answered in the negative then the step is concluded.

If it is answered in the affirmative then at step 2302 the first new switch is selected in nodes table 510 and at step 2303 the designated child node for that switch within the first version is identified. At step 2304 the logs are searched for that node and at step 2305 the copy of that node is identified and entered in the version tables.

At step 2306 a question is asked as to whether there is another version in the versions table and if this question is answered in the affirmative then control is returned to step 2303. If it is answered in the negative then at step 2307 a question is asked as to whether there is another new switch. If this question is answered in the affirmative then control is returned to step 2302 but if it is answered in the negative then step 2010 is concluded.

FIG. 24

Figure 24:
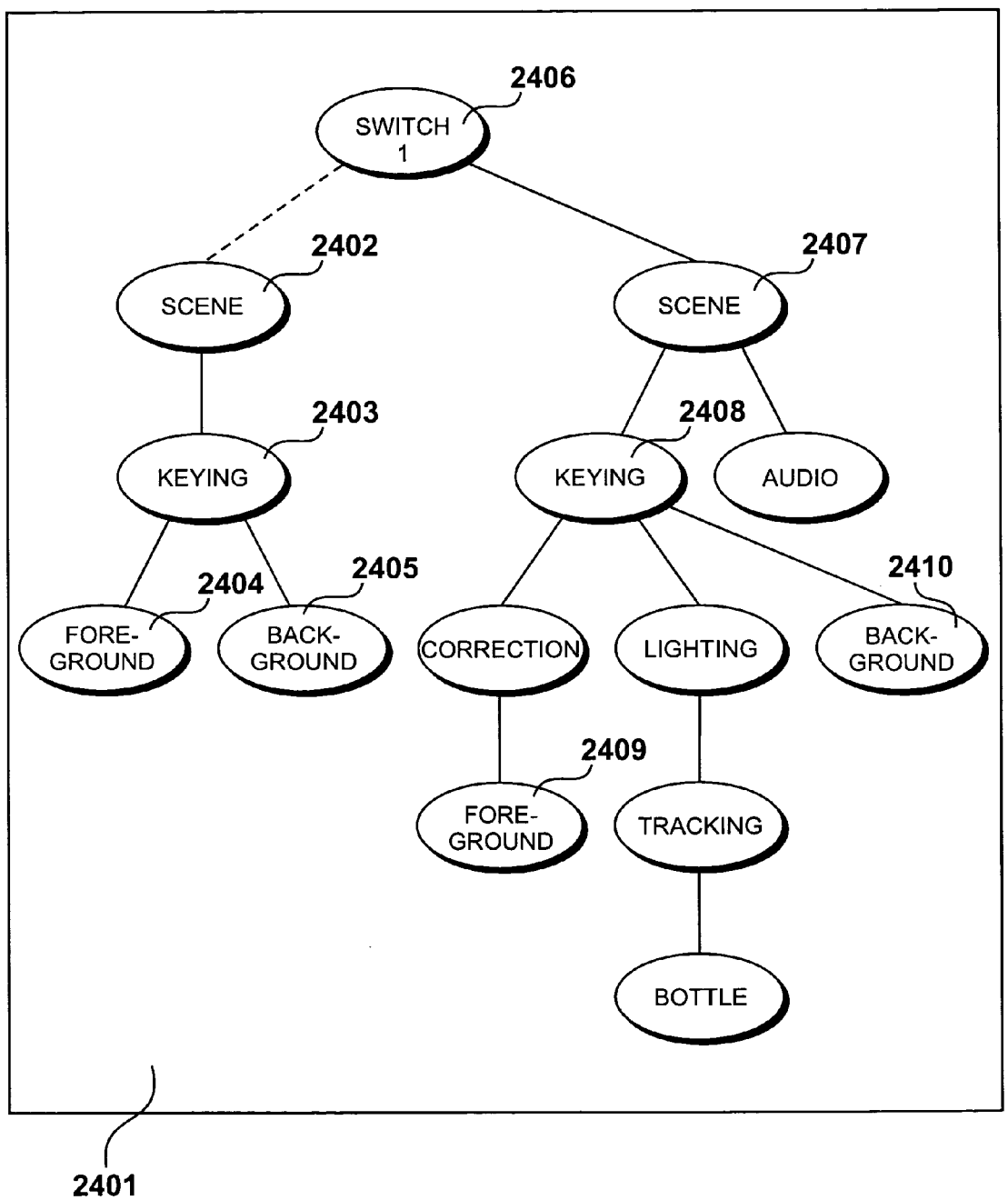
FIG. 24 illustrates a second process tree.

FIG. 24 illustrates a further example of how versioning can be used. Process tree 2401 represents the image data in scene 505. Referring back to FIG. 10, the two versions of this scene are named with dates. In this example the user first created scene output node 2402, keying node 2403 and two nodes pulling frames, 2404 and 2405. Since, in this embodiment, every change is saved as it is made, it is not possible to discard unwanted changes in a scene by simply returning to a previous saved version. However, using switch nodes makes this possible.

In this example, the user selected node 2402 and pressed button 1514, causing the function detailed in FIG. 20 to run. Thus, at step 2004 switch node 2406 was created and at step 2007 node 2402 was copied to create node 2407. At step 2009 node 2403, 2404 and 2405 were copied to create node 2408, 2409 and 2410 respectively and in that order. The user then continued editing by inserting the remaining nodes. Thus, if at any point the user decides that the changes he has made are unwanted and wishes to return to an earlier state, he can continue work on the earlier version or copy the earlier version again to create a third version.

FIG. 25

FIG. 25 shows nodes table 2501 which contains the information necessary to build process tree 2401. The nodes with IDs 0001 to 0004 refer to nodes 2402 to 2405 respectively, the node with ID 0005 refers to switch node 2406 and the remaining node IDs refer to node 2407 and its branch. Thus, depending on the state of switch node 2406, either the first four nodes will be processed or the last nine.

FIG. 26

FIG. 26 shows versions table 2601 that refers to scene 505. As can be seen in this table, in the first version the switch is set to the node whose ID is 0001, that is node 2402, and in the second version the switch is set to the node whose ID 0006, which is node 2407. The user can therefore easily toggle between earlier and later versions of his work.

FIG. 27

Figure 27:
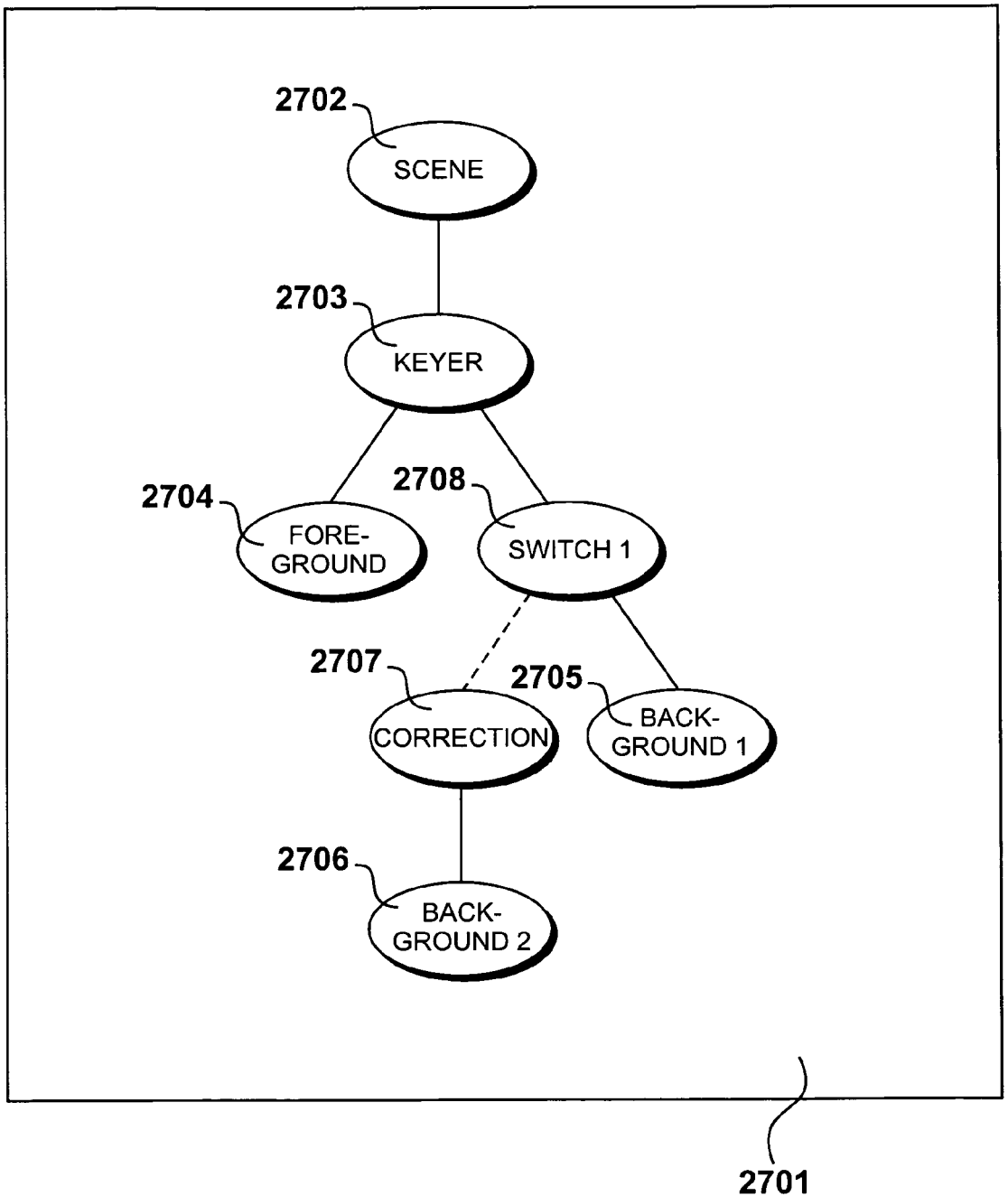
FIG. 27 shows a third process tree.

FIG. 27 shows the process tree of scene 506 and illustrates another example of how switches can be used. In this case process tree 2701 comprises scene output node 2702, keying node 2703, and a frame consisting of foreground information pulled by node 2704. There are two choices of background frame, the first pulled by node 2705 and the second by node 2706. This last also has a colour correction applied by node 2707. Switch node 2708 chooses between the two backgrounds.

Referring to FIG. 10 it can be seen that the two versions of scene 506 are named after the alternative backgrounds. In the example shown in FIG. 12 the six versions created were all needed for slightly different markets, and in the example shown in FIG. 24 switch nodes were used to save an earlier version of the user's work. In this example, the client of the user, for whom the commercial is being made, is unsure which of two backgrounds he requires and has requested that both be made available. The client can then view both versions and decide on which one he wants to use. This viewing could be done either using the image processing environment shown in FIG. 1 or by the user sending the image data, via any normal route such as the Internet, a network or a CD ROM, to the client for viewing on his own image processing system. The client could be running his own version of application 402 or a cheaper and smaller application, such as that described with reference to FIG. 6, which allows only playback and not editing of image data.

FIG. 28

FIG. 28 shows nodes table 2801 which contains the data necessary to produce process tree 2701. For example, node 2708 has ID 0005 and its two options are nodes 2707 with ID 0006 or node 2705 with ID 0004.

FIG. 29

FIG. 29 shows versions table 2901 which contains the versions information for scene 506. The scene only contains one switch and it can be seen that in one version the designated child is node 2705 and in the second version the designated child is node 2706.

It will be appreciated that the examples shown here are not exhaustive of the applications of the present invention. For example, many editing applications do not display the process tree but instead show editing timelines or one-dimensional pipelines. The preferred embodiment could easily be adapted such that the user is presented with ways of inserting switch nodes and creating versions compatible with such a display.

The invention claimed is:

1. Apparatus for processing image data, comprising storage means, processing means and manual input means, wherein said storage means is configured to store said image data and said image data includes a plurality of components defined by a hierarchy of data processing nodes, and said processing means is configured to process each of said data processing nodes in turn, wherein:
    said data processing nodes include one or more standard nodes and one or more switch nodes, each of the one or more switch nodes having at least two child nodes one of which is the designated child node of said switch node, and each of the one or more standard nodes having one or more child nodes; and
    said processing means is configured to:
    process the one or more standard nodes only when each of its child nodes has been processed;
    process the one or more switch nodes when only its designated child node has been processed; and
    save a version of said image data by recording a state of each switch node in the hierarchy of data processing nodes by recording which child node of each switch node is the switch node's designated child node.

2. Apparatus according to claim 1, wherein said processing means is configured not to process any node depending from a child of a switch node if that child is not its designated child node.

3. Apparatus for processing a scene comprising first storage means, processing means and manual input means, wherein:
(a) said first storage means is configured to store a plurality of components used to create the scene that is defined by a hierarchy of data processing nodes, said data processing nodes including switch nodes, wherein:
(i) said switch nodes having two or more child nodes;
(ii) each child node represents a different version of the switch node that is used to generate a different version of the scene; and
(b) said processing means includes second storage means and is configured to store, in either said first or said second storage means, information recording the different versions of the scene by recording different states of said switch nodes.

4. Apparatus according to claim 3, wherein said processing means is configured to store said information after receiving, via said manual input means, data indicating a change in state of one or more switch nodes.

5. Apparatus according to claim 3, wherein a switch node has at least two child nodes and said processing means is configured to process only a designated one of said child nodes, the remainder of the child nodes and their branches remaining unprocessed.

6. Apparatus according to claim 3, wherein said processing means is configured to copy a node and its branch when a switch node is inserted as a parent of said node.

7. Apparatus according to claim 3, wherein said processing means is configured to copy a node but not its branch when a switch node is inserted as a parent of said node.

8. Apparatus according to claim 3, wherein said information recording the states of said switch nodes defines a plurality of versions of said image data.

9. A computer-implemented method of processing image data, comprising the steps of:
(a) loading, using a computer processor, a hierarchy of data processing nodes, including standard nodes and switch nodes, into memory, wherein said hierarchy of data processing nodes defines a plurality of image components; and
(b) selecting and processing, using the computer processor each data processing node in turn to output processed image data, wherein:
a standard node has one or more child nodes;
a switch node has two or more child nodes;
the standard node is not processed until all of its child nodes have been processed, and
the switch node is processed when only one of its child nodes has been processed; and
(c) storing a version or the image data by recording a state of each switch node in the hierarchy of data processing nodes by recording which child node of each switch node is the switch node's designated child node.

10. A method according to claim 9, wherein the switch node has at least two child nodes, one of which is identified as its designated child node and the remainder being non-designated child nodes, and said non-designated child nodes and all nodes depending from them are not processed.

11. A computer-implemented method of processing a scene said method comprising the steps of:
receiving, in a computer processor, said scene comprised of a plurality of components, wherein said scene is defined by a hierarchy of data processing nodes, said data processing nodes including switch nodes having two or more child nodes, wherein each child node represents a different version of the switch node that is used to generate a different version of the scene;
receiving, in the computer processor, data indicating a change in state of one or more switch nodes, and
storing, using the computer processor, information recording the different versions of the scene by recording different states of said switch nodes.

12. A method according to claim 11, further comprising the step of processing said nodes, wherein a switch node has at least two child nodes and only a designated one of said child nodes is processed, the remainder of the child nodes and their branches remaining unprocessed.

13. A method according to claim 11, further comprising the steps of:
receiving data input indicating that a new switch node is to be inserted as a parent of a selected node;
creating the new switch node;
setting said selected node to be a child of said new switch node;
copying said selected node and its branch; and
setting said copy of said selected node to be a child of said new switch node.

14. A method according to claim 11, further comprising the steps of;
receiving data input indicating that a new switch node is to be inserted as a parent of a selected node;
creating the new switch node;
setting said selected node to be a child node of said new switch node;
copying said selected node to create a copy node;
setting said copy node to be a parent node of the child nodes of said selected node; and
setting said copy node to be a child node of said new switch node.

15. A method according to claim 11, wherein more than one version of said image data is stored in the hierarchy of data processing nodes.

16. A computer system comprising:
(a) a computer having a memory; and
(b) an application executing on the computer, wherein the application is configured to:
(i) load a hierarchy of data processing nodes, including standard nodes and switch nodes, into memory, wherein said hierarchy of data processing nodes defines a plurality of image components, and wherein a standard node has one or more child nodes and a switch node has two or more child nodes; and
(ii) select and process each data processing node in turn, wherein a standard node is not processed until all of its child nodes have been processed, and a switch node is processed when only one of its child nodes has been processed; and
(iii) save a version of image data by recording a state of each switch node in the hierarchy at data processing nodes by recording which child node of each switch node is the switch node's designated child node.

17. A computer system programmed to execute stored instructions according to claim 16, wherein a switch node has at least two child nodes, one of which is identified as its designated child node and the remainder being non-designated child nodes, and said non-designated child nodes and all nodes depending from them are not processed.

18. A computer system comprising:
(a) a computer having a memory; and
(b) an application executing on the computer, wherein the application is configured to:

(i) load a scene by loading a hierarchy of data processing nodes that define a plurality of image components into memory, said data processing nodes including switch nodes, wherein:
   (1) said switch nodes have two or more child nodes;
   (2) each child node represents a different version of the switch node that is used to generate a different version of the scene;
(ii) receive data indicating a change in state of one or more switch nodes, and
(iii) store information recording the different versions of the scene by recording different states of said switch nodes.

19. A computer system programmed to execute stored instructions according to claim 18, wherein said computer system is further configured to process said nodes, wherein a switch node has at least two child nodes and only a designated one of said child nodes is processed, the remainder of the child nodes and their branches remaining unprocessed.

20. A computer system programmed to execute stored instructions according to claim 18, wherein said computer system is further configured to:
   receive data input indicating that a new switch node is to be inserted as a parent of a selected node;
   create the new switch node;
   set said selected node to be a child of said new switch node;
   copy said selected node and its branch; and
   set said copy of said selected node to be a child of said switch node.

21. A computer system programmed to execute stored instructions according to claim 18, wherein said computer system is further configured to:
   receive data input indicating that a new switch node is to be inserted as a parent of a selected node;
   create the new switch node;
   set said selected node to be a child node of said new switch node;
   copy said selected node to create a copy node;
   set said copy node to be a parent node of the child nodes of said selected node; and
   set said copy node to be a child node of said new switch node.

22. A computer system programmed to execute stored instructions claim 18, wherein said computer system is configured to store more than one version of the states of said switch nodes in the hierarchy of data processing nodes.

23. A computer-readable medium having computer-readable instructions executable by a computer such that, when executing said instructions, a computer will perform the steps of:
   (a) loading a hierarchy of data processing nodes, including standard nodes and switch nodes, into memory, wherein said hierarchy of data processing nodes defines a plurality of image components; and
   (b) selecting and processing each data processing node in turn, wherein:
      (i) standard node has one or more child nodes;
      (ii) a switch node has two or more child nodes;
      (iii) a standard node is not processed until all of its child nodes have been processed, and
      (iv) a switch node is processed when only one of its child nodes has been processed; and
   (c) saving a version of image data by recording a state of each switch node in the hierarchy of data processing nodes by recording which child node of each switch node is the switch node's designated child node.

24. A computer-readable medium having computer-readable instructions according to claim 23, wherein a switch node has at least two child nodes, one of which is identified as its designated child node and the remainder being non-designated child nodes, and said non-designated child nodes and all nodes depending from them are not processed.

25. A computer-readable medium having computer-readable instructions executable by a computer such that, when executing said instructions, a computer will perform the steps of:
   (a) loading a scene by loading a hierarchy of data processing nodes that define a plurality of image components into memory, said data processing nodes including switch nodes, wherein:
      (i) said switch nodes have two or more child nodes;
      (ii) each child node represents a different version of the switch node that is used to generate a different version of the scene;
   (b) receiving data indicating a change in state of one or more switch nodes, and
   (c) storing information recording the different versions of the scene by recording different states of said switch nodes.

26. A computer-readable medium having computer-readable instructions according to claim 25, such that when executing said instructions a computer will also perform the step of processing said nodes, wherein a switch node has at least two child nodes and only a designated one of said child nodes is processed, the remainder of the child nodes and their branches remaining unprocessed.

27. A computer-readable medium having computer-readable instructions according to claim 25, such that when executing said instructions a computer will also perform the steps of:
   receiving data input indicating that a new switch node is to be inserted as a parent of a selected node;
   creating the new switch node;
   setting said selected node to be a child of said new switch node;
   copying said selected node and its branch; and
   setting said copy of said selected node to be a child of said new switch node.

28. A computer-readable medium having computer-readable instructions according to claim 25, such that when executing said instructions a computer will also perform the steps of:
   receiving data input indicating that a new switch node is to be inserted as a parent of a selected node;
   creating the new switch node;
   setting said selected node to be a child node of said new switch node;
   copying said selected node to create a copy node;
   setting said copy node to be a parent node of the child nodes of said selected node; and
   setting said copy node to be a child node of said new switch node.

29. A computer-readable medium having computer-readable readable instructions according to claim 25, such that when executing said instructions a computer will store more than one version of the states of said switch nodes in the hierarchy of data processing nodes.

\* \* \* \* \*